United States Patent
Paramonoff

[11] 3,881,380
[45] May 6, 1975

[54] SCRAP DISPOSAL MECHANISM FOR METALLIC CAN BODY TRIMMERS

[75] Inventor: Elpidifor Paramonoff, Los Angeles, Calif.

[73] Assignee: Standun, Incorporated, Compton, Calif.

[22] Filed: Jan. 12, 1973

[21] Appl. No.: 323,330

[52] U.S. Cl. .................. 83/150; 83/152; 83/185; 83/186; 83/337; 83/409; 83/519; 83/646; 83/923
[51] Int. Cl. ........................................... B23d 21/14
[58] Field of Search ............ 83/150, 185, 186, 337, 83/519, 646, 923, 152, 409

[56] References Cited
UNITED STATES PATENTS

| | | | |
|---|---|---|---|
| 2,074,547 | 3/1937 | Hessenbruch | 83/923 X |
| 2,702,597 | 2/1955 | Wickwire et al | 83/923 X |
| 2,742,086 | 4/1956 | Reid | 83/923 X |
| 3,435,718 | 4/1969 | Widam | 83/185 |

*Primary Examiner*—Frank T. Yost
*Attorney, Agent, or Firm*—Mahoney, Schick & Cislo

[57] ABSTRACT

A one-piece metallic can body positioned stationary on a mandrel has a can body open end trimmed by cutting a scrap ring therefrom which, after such trimming, still surrounds portions of the trimmer mechanisms. During the can body trimming, the can body open end portion ultimately forming the scrap ring, although stationary during trimming, is received in slotted scrap positioners of diametrically opposite, constantly rotating nipper assemblies with the scrap ring immediately being rotated by the scrap positioners upon complete severance from the can body. As the nipper assemblies rotate rotating the now severed scrap ring, the nipper assemblies are actuated, one at a time, by an actuator at a set circumferential location, the nipper assemblies having nipper rods cammed reciprocally inwardly along the scrap positioners to cut the scrap ring into two separated parts. As soon as the scrap ring parts are separated, they are urged outwardly by centrifical force away from the trimmer components and ultimately fall downwardly into a scrap disposal chute. A constantly rotating, peripherally threaded, scrap removal cylinder is positioned inwardly of the nipper assemblies and trimmer mechanisms for constantly urging any portions of the scrap ring or pieces axially away from the trimmer mechanisms in the event they are displaced inwardly thereagainst.

22 Claims, 27 Drawing Figures

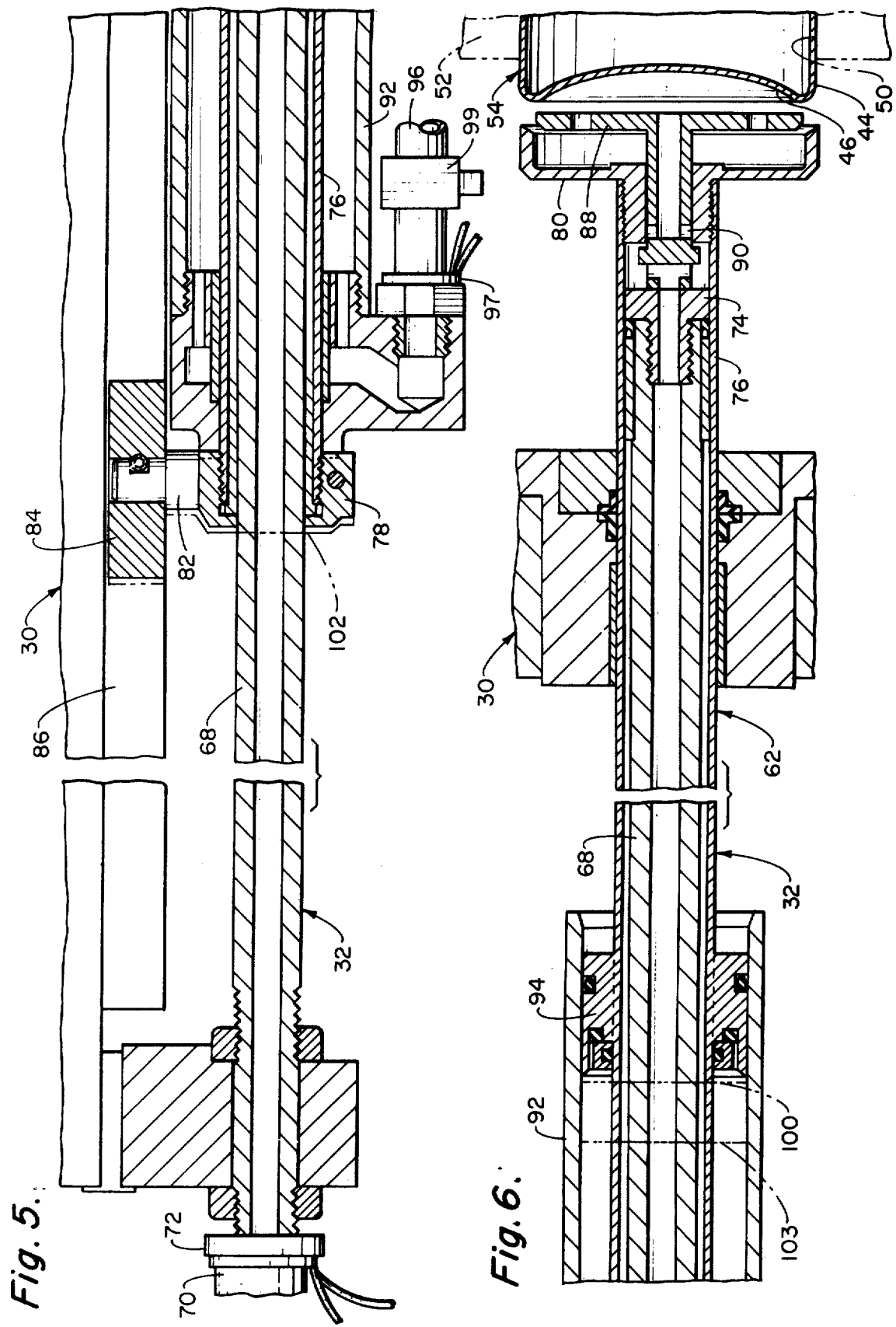

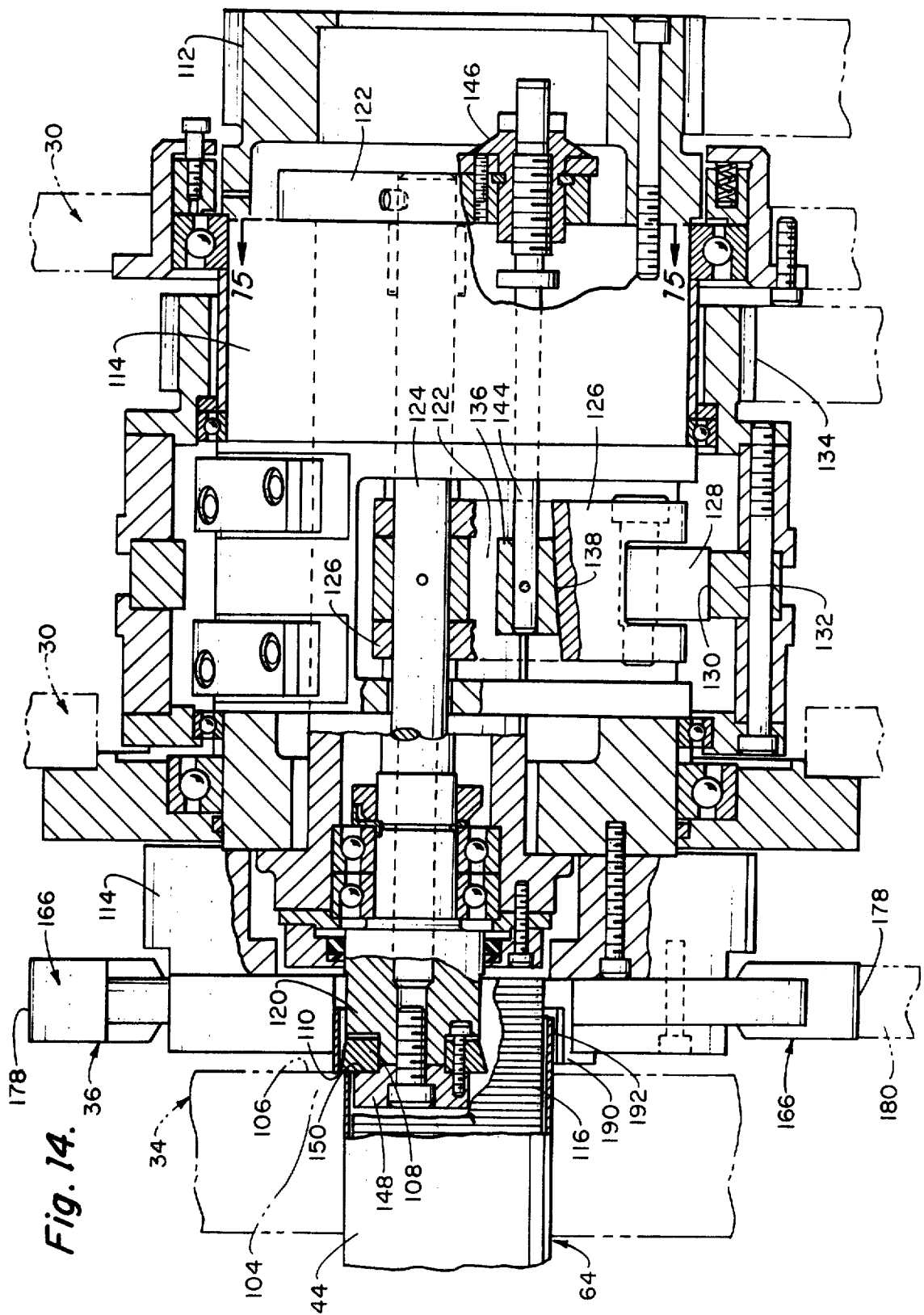

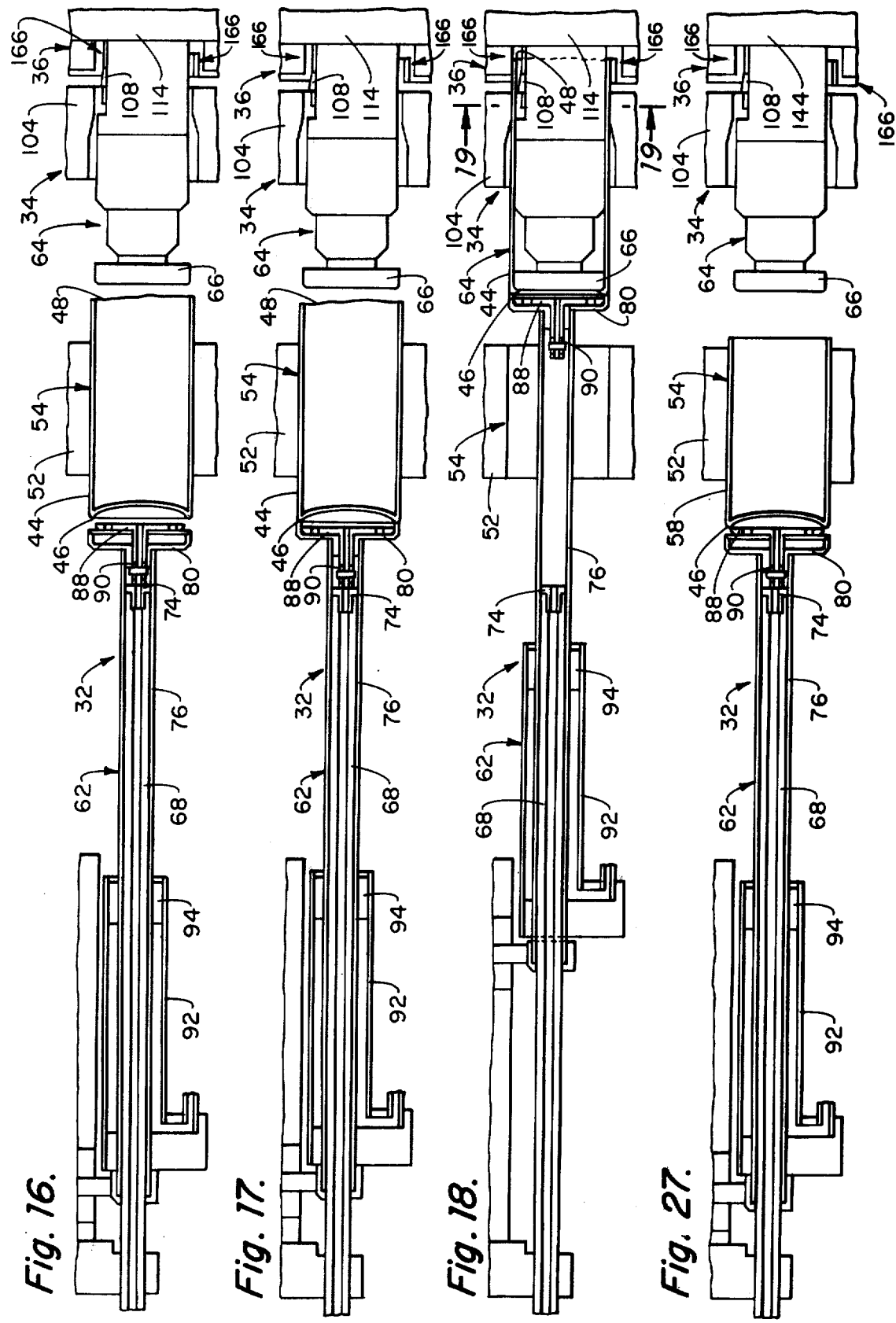

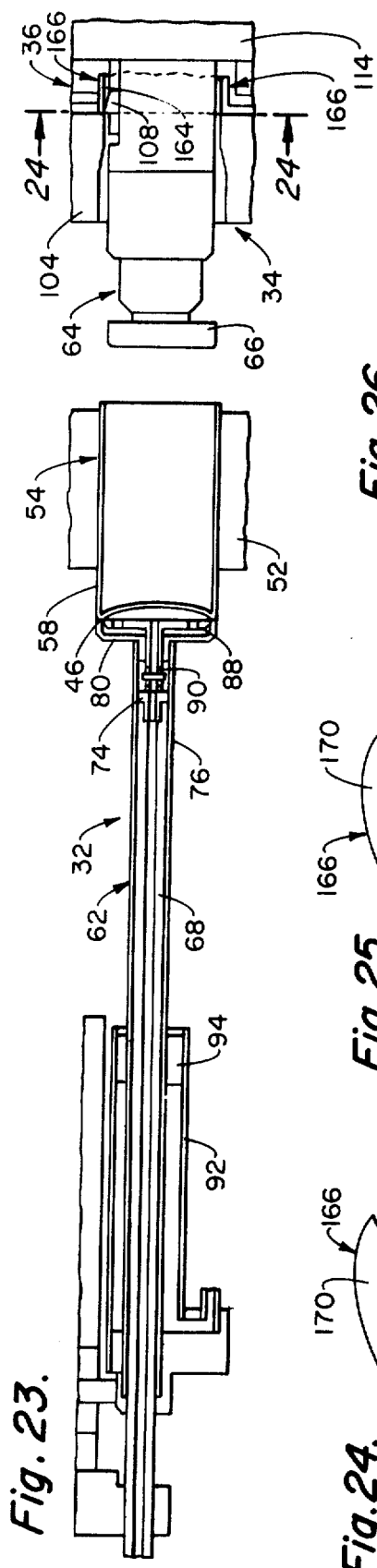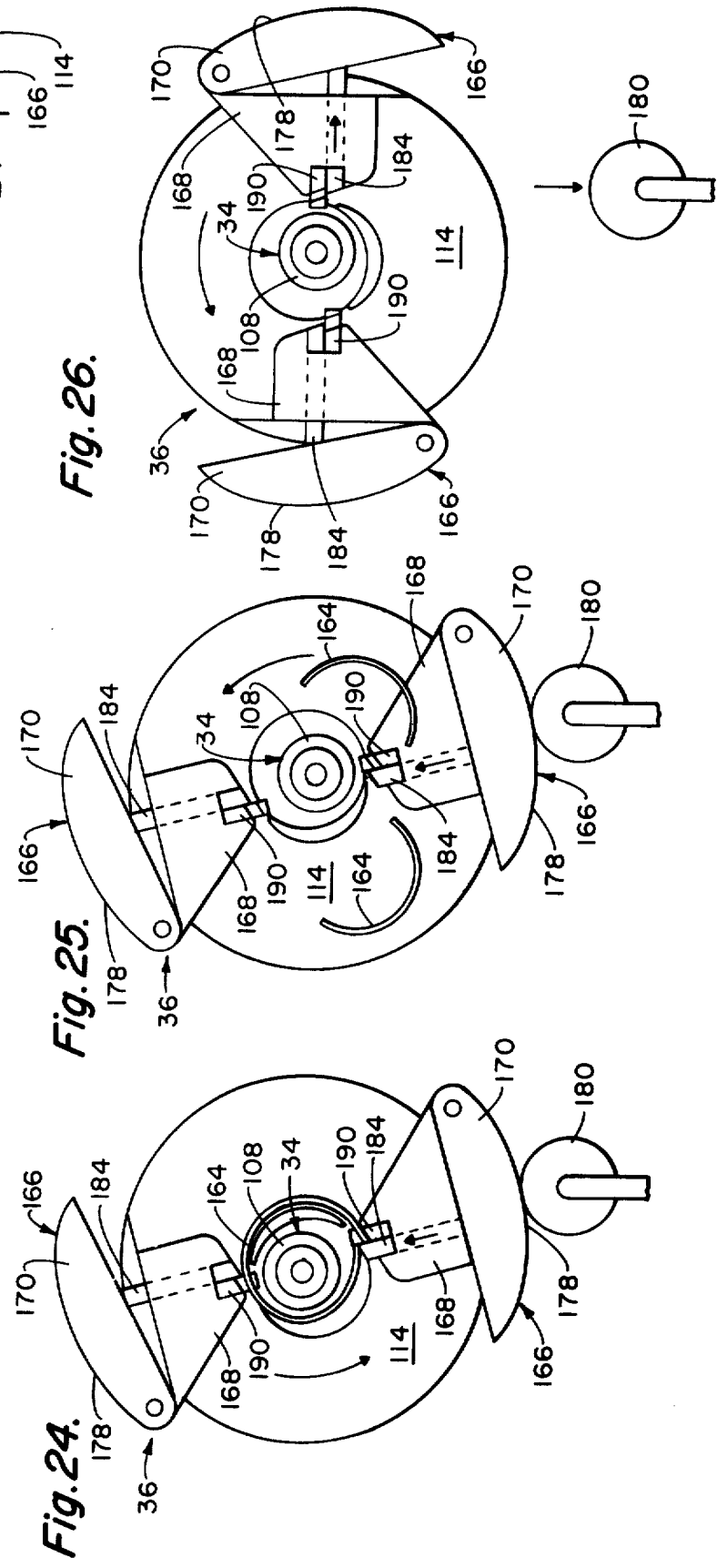

SCRAP DISPOSAL MECHANISM FOR METALLIC CAN BODY TRIMMERS

BACKGROUND OF THE INVENTION

This invention relates to a scrap ring disposal mechanism for metallic can body trimmers and the like, and more particularly, to such a mechanism uniquely formed for positioning the annular scrap ring severed from the can body open end properly aligned for a nipper assembly or assemblies to cut the scrap ring into separated pieces which may move away from the area of trimming so as to clear the area of trimming for the next can body trimming cycle. Furthermore, the present invention relates to a scrap disposal mechanism of the foregoing general type having various unique forms of mechanisms incorporated therein providing preferably both positive scrap ring cutting and positive resulting scrap piece disposal so as to eliminate any danger of interference by the scrap ring or the pieces thereof with the important other can body trimming components of the metallic can body trimmer.

With the usual trimming mechanisms of metallic can body trimmers, a one-piece metallic can body is positioned on some form of trimming mandrel with a can body open end projecting axially through trimmer mechanisms, the purpose of which is to trim the can body to an exact desired axial length by the removal of a scrap ring from the open end thereof. It is well established in the can making industry that the only satisfactory method for the trimming of the can body is to trim the scrap ring from the open end thereof by cutting or trimming the can body walls from internally radially outwardly rather than from the outside radially inwardly. It is vitally important that the trimming operation be accomplished in this manner so that any possible burr remaining on the can body walls at the trimmed open end thereof will project outwardly, rather than inwardly, so as to eliminate the possibility of metal slivers being broken from the trimmed end of the can body walls during the final filling of the can body and the sealing of the second can body end wall on this open end, as well as to eliminate certain other problems which can be created during the final filling and end wall sealing operations if the end wall burr is internally rather than externally.

The trimming mechanisms provided for accomplishing the can body wall trimming operation, therefore, normally comprise an outer trimming knife of some form which approaches the walls of the can body at the open end thereof and some form of internal trimming knife which by interaction with the outer knife at least partially penetrates the can body walls for making a circumferential cut to sever the scrap ring from the can body walls. Obviously, if the can body trimming is to be accomplished in this manner, the internal or inner trimming knife must be properly supported by frame members projecting axially from the can body open end in order for the trimming knife to be sufficiently rigid for accomplishing the metal trimming against the outer trimming knife. The important result, relative to the ultimately produced scrap ring, is that after the wall trimming operation of the can body has been completed and the scrap ring produced, this scrap ring still surrounds portions of the internal trimming knife and its supporting frame members.

Thus, although the now trimmed can body can be relatively easily removed from the trimming mandrel merely by axial movement thereof closed end first and open end trailing, the trimmer knife and supporting frame members, due to their necessary positioning, prevent the scrap ring from being removed from the trimming area as long as the scrap ring remains an integral ring. This presents the only possible solution of cutting or nipping the resulting scrap ring into separated scrap pieces sufficiently less trimmer knife and frame member encompassing so that these scrap pieces may fall downwardly away from the trimmer knife and frame members to clear the trimming area for the next can body trimming operation and the production of the next scrap ring. In can body trimmers, scrap ring cutting or nipping assemblies are provided for this scrap ring cutting necessarily directly axially adjacent the trimming mechanisms since this is where the scrap ring is produced.

The problems of proper scrap ring cutting to produce the required form of scrap ring pieces and the disposal thereof are numerous. As a first matter, the nipper assembly or assemblies forming a part of the scrap disposal mechanism must be properly positioned relative to the scrap ring produced and properly actionable for completely cutting the scrap ring into pieces on a repeated cycling basis. Furthermore, there must be an absolute assurance that either the scrap ring during the cutting thereof into pieces or the resulting pieces will not become displaced into the closely adjacent vital trimming mechanisms, particularly including the trimming knife, where severe damage to expensive trimming mechanism equipment could accidentally be caused. Still further, and somwhat linked with the immediately foregoing, the scrap pieces after cutting from the scrap ring must be moved outwardly away from the trimming mechanisms so as to ultimately fall downwardly and be collected remote from the can wall trimming area.

If the scrap ring is not properly cut into the intended scrap ring pieces during each cycling of the trimmer equipment, the scrap ring remains during the next trimming operation and during the production of the next scrap ring. This can cause the possibility of the damage to the trimming knife and/or other adjacent trimming components as previously discussed. The result can be, therefore, damage to expensive trimming equipment and the ultimate shutdown of the trimming equipment for a loss of valuable production time.

The improper positioning of the scrap ring during the cutting thereof or the displacement of the scrap ring or its resulting cut pieces toward the trimming mechanisms can likewise have the same results. This is also true of improper direction of the cut scrap ring pieces away from the trimming area after the scrap ring cutting into such pieces. Thus, a scrap ring disposal mechanism must be provided eliminating the foregoing problems and the danger of damage to valuable trimming mechanism components, as well as the loss of production time.

OBJECTS AND SUMMARY OF THE INVENTION

It is, therefore, an object of this invention to provide a scrap disposal mechanism for metallic can body trimmers and the like which may include a unique form of nipper assembly operable for performing the scrap ring cutting function in a positive, yet relatively simple manner, assuring an absolute performance of the scrap ring cutting function during every trimmer cycling. According to certain of the principles of the present invention, and directed toward the positive, yet simplicity, functioning, at least two rotatable nipper assemblies are provided each separately actionable for cutting the scrap ring ultimately into separated pieces. The two rotatable nipper assemblies are actuated, one at a time by a single actuator located at a set circumferential location, the nipper assemblies being actuated thereby during passage of the nipper assemblies circumferentially by the actuator set circumferential location. With only a single actuator to be controlled on a predetermined timed basis, the overall scrap disposal mechanism may be constructed in a more simplified manner without sacrificing the absolute and positive nipper assembly actuation control.

It is a further object of this invention to provide a scrap disposal mechanism for metallic can body trimmers and the like wherein, according to certain other principles of the present invention, the scrap disposal mechanism may include a positive arrangement for constantly rotating the scrap ring during the cutting thereof into the intended scrap ring pieces so that when the scrap ring pieces are properly and completely separated, the scrap ring pieces are urged outwardly by centrifical force away from and free of any danger of contracting the important other trimming components of the trimmer. This also accomplishes the clearing of the trimming area of the scrap ring and its cut pieces so that this trimming area is clear for the next trimming operation on the next can body to be trimmed. In a preferred embodiment of the present invention, the can body to be trimmed, when inserted axially over the trimming mandrel and into final trimming position, has the walls at the open end thereof and that portion forming at least a part of the finally resulting scrap ring received in preferably constantly rotating scrap positioners. Thus, when the trimming operation is complete and the scrap ring produced, the scrap ring is maintained rotated by the scrap positioners during the scrap ring cutting or nipper operations so that as soon as the scrap ring pieces are separated by the nipper mechanism or mechanisms, the rotation immediately results in outward urging thereof by centrifical force away from the area of the can body trimming mechanisms.

It is still a further object of this invention to provide a scrap disposal mechanism for metallic can body trimmers and the like which may include particularly formed nipper assemblies of a unique cam actuated nature for the scrap ring cutting function and which accomplish positive scrap ring cuts without danger of failure, thereby assuring that the important scrap ring disposal operations will be performed during every overall can body trimming cycle. As previously stated, in the preferred embodiment of the present invention, two nipper assemblies are provided and each is comprised of a pivotal cam member having an outwardly facing and generally circumferentially extending cam surface thereon which cam member pivots inwardly against a reciprocal nipper rod operable in inward movement to perform the scrap ring cutting. By positioning the actuator for the nipper mechanisms aligned for contact by the cam member cam surfaces in the circumferential movement of the nipper assemblies by the actuator, a positive scrap ring cutting or nipping operation can be assured on a positive basis, virtually eliminating the danger of any malfunctioning.

It is an additional object of this invention to provide a scrap disposal mechanism for metallic can body trimmers and the like which, again in the preferred form thereof, may include a unique scrap removal mechanism inward of the scrap ring cutting or nipping assemblies, as well as inward of the trimming mechanisms, which scrap removal mechanism is always operable tending to move any scrap ring back into proper scrap ring nipping position relative to the nipper assemblies if it becomes displaced from proper nipping position. The unique scrap removal mechanism also tends to move any cut scrap ring pieces away from the important metal cutting or trimming components in the event such scrap ring pieces move into a position endangering such cutting or trimming components. The scrap removal mechanism may include a constantly rotating cylinder inward of the nipper assemblies and trimmer components with the constantly rotating cylinder having means formed thereon functioning tending to move the scrap ring or scrap pieces away from the trimming components in the event they enter the trimming area into contact with this rotating cylinder.

Other objects and advantages of the invention will be apparent from the following specification and the accompanying drawings which are for the purpose of illustration only.

BRIEF DESCRIPTION OF THE DRAWINGS

FIG. 5 is an enlarged, fragmentary, vertical sectional view looking in the direction of the arrows 5—5 in FIG. 4 and showing the pusher mechanism still in fully retracted position;

FIG. 6 is an enlarged, fragmentary, vertical sectional view looking in the direction of the arrows 6—6 in FIG. 4 and showing the pusher mechanism still in the fully retracted position, but a can body positioned for contact thereby;

FIG. 14 is a fragmentary, vertical sectional view looking in the direction of the arrows 14—14 in FIG. 13;

FIGS. 16, 17, 18, 23 and 27 are diagrammatic views showing the pusher mechanism in various progressive stages of movement from fully retracted position through the movement thereby of an untrimmed can body at the feed station to the trimming station and movement of the trimmed can body from the trimming station back to the feed station with the feed mechanism ejecting the same therefrom;

FIGS. 24, 25 and 26 are schematic views similar to those of FIGS. 19 through 22, but showing the scrap disposal operation.

DESCRIPTION OF THE BEST EMBODIMENTS CONTEMPLATED

Figure 1:
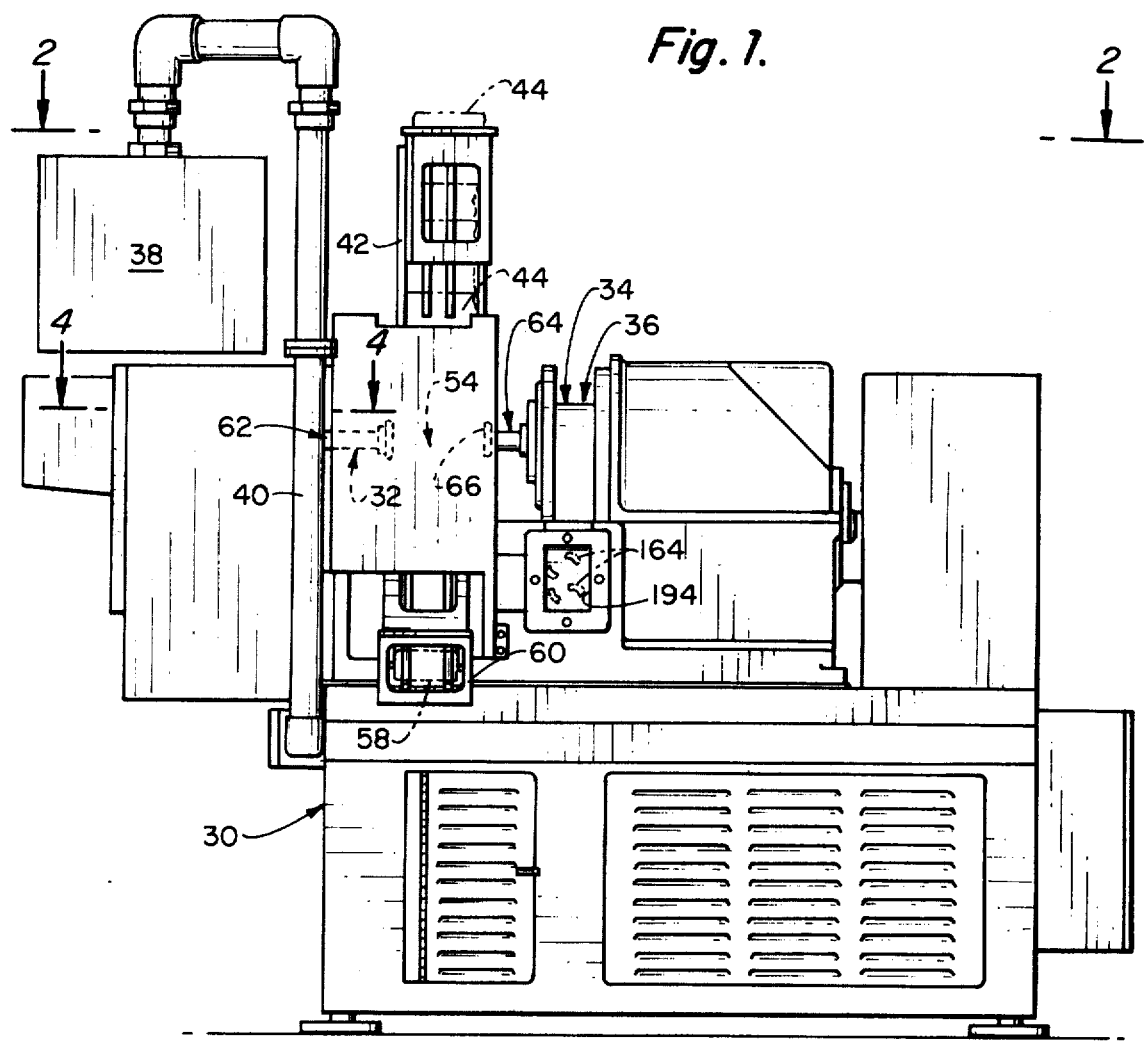
FIG. 1 is a side elevational view of a metallic can body trimmer incorporating a preferred embodiment of the principles of the present invention.
Figure 2:
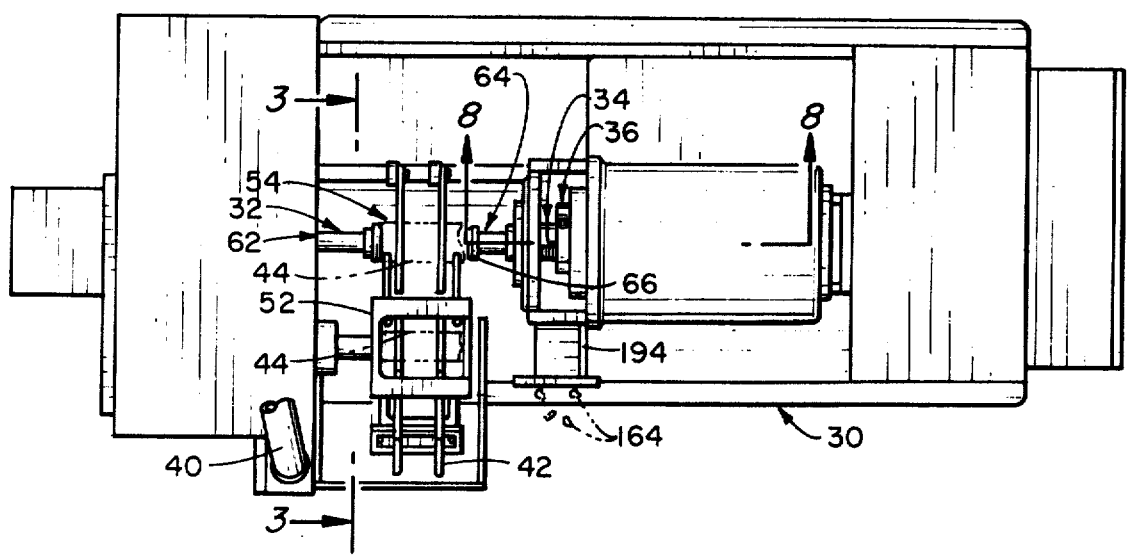
FIG. 2 is a top plan view looking in the direction of the arrows 2—2 in FIG. 1.
Figure 3:
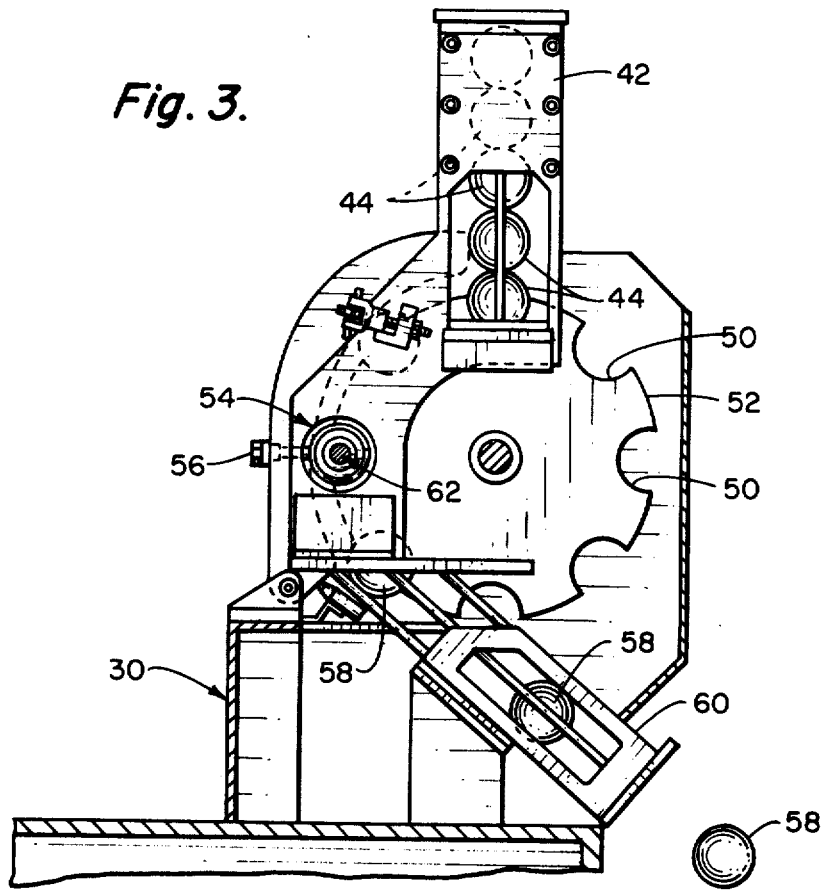
FIG. 3 is a fragmentary, vertical sectional view looking in the direction of the arrows 3—3 in FIG. 2.

Referring to the drawings an embodiment of an overall metallic can body trimmer assembly is shown in FIGS. 1, 2 and 3, and includes an overall usual main frame generally indicated at 30 supporting and housing, in some cases, various working component assemblies necessary for an operable overall trimmer assembly. For purposes of convenience of description, the trimmer assembly will be described generally immediately below and the description will then be segregated into the individual working component assemblies for a specific description of each of these assemblies, finally followed by a general description of overall trimmer operation. The individual component assemblies or sub-assemblies to be specifically described are a feed and positioning mechanism assembly generally indicated at 32, a trimming mechanism assembly generally indicated at 34 and a scrap disposal assembly generally indicated at 36.

Returning to the overall trimmer assembly generally, electrical power is fed to the trimmer assembly through an electrical control panel 38 and into the main frame 30 through an enclosing electrical conduit 40. A compressed air supply is similarly fed into the main frame 30 and presented for those components requiring the same in the usual manner and as will be hereinafter specifically described particularly relative to the feed and positioning mechanism assembly 32. The main frame 30 also houses the principal electrical motor and connecting gearing systems necessary for the driving of the various component assemblies of the trimmer assembly, the operable connections therebetween being in the usual manner and as will be more clearly understood from the following specific descriptions.

The various parts and components of the trimmer assembly are formed of the usual materials and in the usual manner, all well known to those skilled in the art, except as specifically hereinafter pointed out. Furthermore, although a specific preferred embodiment of the various mechanisms is shown in the drawings and hereinafter described, it is not intended to limit the principles of the present invention to the specific embodiment. Rather the principles of the present invention should be broadly construed within the limitations defined by the following claims.

FEED AND POSITIONING MECHANISM ASSEMBLY

Referring particularly to FIGS. 1 through 8 of the drawings, the feed and positioning mechanism assembly 32 includes a generally vertical infeed guide 42 for feeding a continuous series of drawn and wall ironed untrimmed metallic can bodies 44 having closed ends 46 and open ends 48 downwardly for one at a time reception in pockets 50 of a rotatable star wheel 52. The untrimmed can bodies 44 are, at this stage and from the formation standpoint, substantially finished except for the final wall trimming operation which trims the can bodies to desired length. Furthermore, the untrimmed can bodies 44 are preferably formed of appropriate metals such as aluminum, tinplate and black iron, and have wall thicknesses in the order to 0.008ths inches thick, being useable for containing beverages, for instance, such as beer and soft drinks.

The star wheel 52 is of usual timed indexing form approximately driven by means well known to those skilled in the art and timed for proper operation in relationship to the operation of the various other components as will be hereinafter described. As shown, the star wheel 52 rotates about a horizontal axis and moves the untrimmed can bodies 44 in timed indexing movement, counterclockwise as shown in FIG. 3 in two indexing steps to a feed station generally indicated at 54 where each particular can body is sensed by a proximity sensor 56 of usual form and in the usual manner to be sure that a can body is at the feed station for permitting operation of the other components of the assembly. As will be apparent from a later description, the particular untrimmed can body 44 at the feed station 54 is removed therefrom for trimming and then is returned as a wall trimmed can body 58 with the progressive indexing movements of the star wheel 52 in two such indexing movements releasing the trimmed can bodies 58 into the downwardly angled outfeed guide 60, where the trimmed can bodies move downwardly by gravity into an appropriate receptacle or other conveying equipment (not shown).

At the feed station 54, the untrimmed can bodies 44 are retained by the star wheel 52 with the cylindrical axis thereof horizontal, the closed ends 46 to the left and the open ends 48 to the right as shown. Preferably axially aligned with the feed station 54 is a pusher mechanism generally indicated at 62 and shown in detail in FIGS. 4 through 6. The pusher mechanism 62 is retracted position is fully to the left of the feed station 54 (FIGS. 2, 5 and 6) but is movable axially to an extended position through the feed station 54 and the appropriate pocket 50 of the star wheel 52 and ultimately to a trimming station generally indicated at 64, the trimming station, as well as a trimming mandrel 66 at said station, being a part of the trimming mechanism assembly 34 to be hereinafter described.

Figure 4:
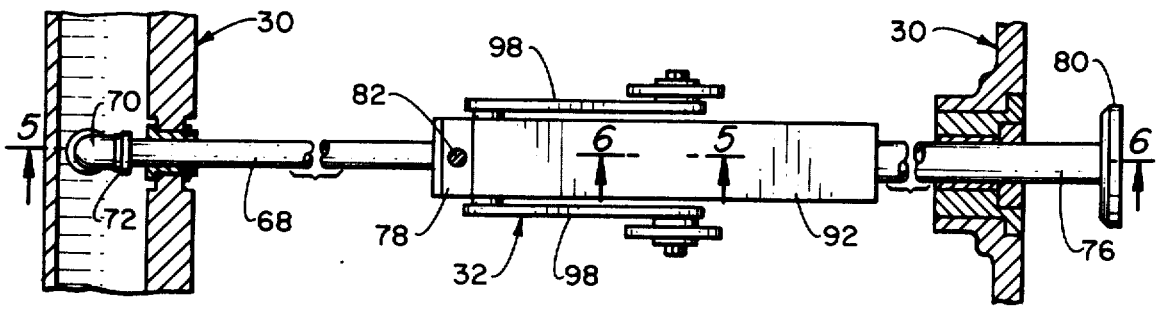
FIG. 4 is an enlarged fragmentary, horizontal sectional view looking in the direction of the arrows 4—4 in FIG. 1 and showing a pusher mechanism incorporated in the trimmer of FIG. 1, the pusher mechanism being in fully withdrawn or retracted position.

As shown in FIGS. 4 through 6, the pusher mechanism 62 includes an axially extending, stationary vacuum tube 68 rigidly secured in communication with a vacuum supply tube 70 at its left hand end. A vacuum flow sensor 72 is connected in communication with the interior of the vacuum supply tube 70 (FIG. 5) for sensing the continued flow therein in the usual manner and is electrically connected to appropriate controls for interrupting or shutting down operation of the trimmer in the event of sensing a continuous flow of a vacuum as will be hereinafter more completely described. The vacuum tube 68 terminates at its right hand end spaced axially from the feed station 54 in an ejector stop 74, although the opening of the vacuum tube communicates centrally therethrough opening to the right of the ejector stop (FIG. 6).

A pusher tube 76 telescopes the vacuum tube 68, being axially reciprocal thereon through appropriate bearings. At the left hand end, the pusher tube 76 terminates in a radially outwardly enlarged cylinder abutment collar 78, and at the right hand end, the pusher tube terminates spaced axially beyond the right hand end of the vacuum tube 68 in a radially enlarged vacuum cup 80, open to the right. A vertically upwardly extending guide 82 is secured to the cylinder abutment collar 78 and is, in turn, upwardly received into a guide block 84 slideably guided axially in a guide slot 86 for aiding and guiding the axial reciprocal movements of the pusher tube 76.

Figure 7:
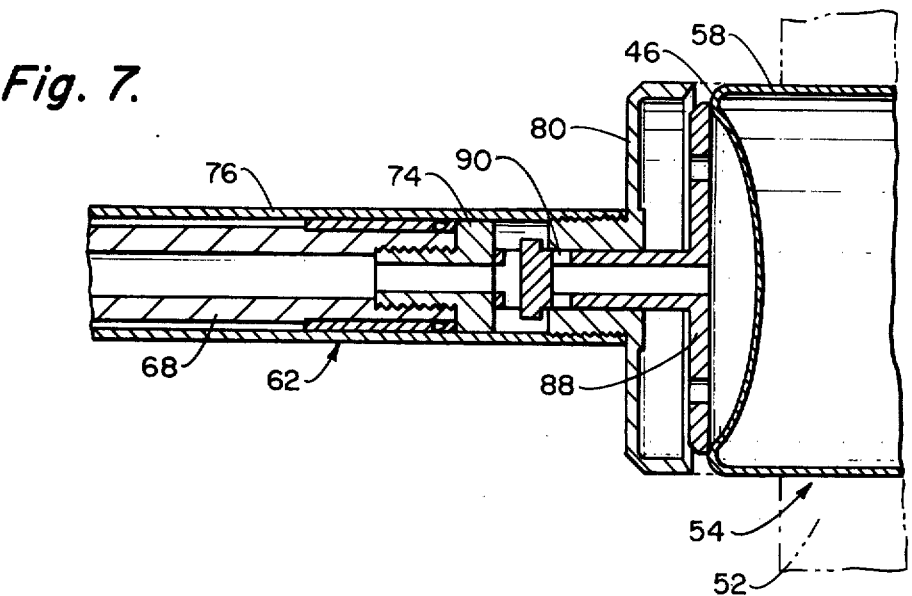
FIG. 7 is a fragmentary, vertical sectional view taken from the right hand portion of FIG. 6, but showing the pusher mechanism in fully retracted position immediately after the ejection of a trimmed can body therefrom.

An ejector 88 is axially slideably mounted within the vacuum cup 80 and the right hand end of the pusher tube 76, and includes a vacuum opening 90 therein opening axially to the right within the opening of the vacuum cup 80 and opening radially spaced from the ejector left hand end into the pusher tube 76. Thus, when the ejector 88 is moved to the left, as shown in FIG. 6, fully within the vacuum cup 80, the vacuum opening 90 thereof is exposed to the vacuum tube 68 and vacuum is supplied therethrough to the vacuum cup 80. When, however, the ejector 88 is moved fully forwardly or to the right projecting from the vacuum cup 80 as shown in FIG. 7, the vacuum opening 90 is closed off by the vacuum cup so that there is no vacuum flow therethrough and the vacuum tube 68 is closed off, all in a manner and for a purpose to be hereinafter described.

Directly forwardly or to the right of the cylinder abutment collar 78, the pusher tube 76 is telescoped by a fluid cylinder 92, preferably a pneumatic cylinder, which is spaced outwardly from the pusher tube and is appropriately sealed at opposite ends thereof on the pusher tube for axial slideable movement relative thereto. Such slideable sealing of the cylinder 92 at the forward or right hand end thereof, is constituted by a piston 94 secured to the pusher tube 76. At the rearward or left hand end of the cylinder 92, the interior thereof is connected in communication with a fluid supply line 96 for supplying fluid, preferably gaseous fluid such as air, under pressure to the cylinder. Also communicating into the cylinder 92 preferably at the fluid or air supply line 96 is a pressure sensor 97 and a dump valve 99, the pressure sensor 97 being for sensing fluid or air pressure within the cylinder above a predetermined pressure and having electrical connection to the main controls of the trimmer for interrupting operation of the same upon such higher predetermined pressure being sensed, and the dump valve 99 being for exhausting air pressure from the cylinder at least above said predetermined pressure, these again being for a purpose to be hereinafter described.

As best seen in FIG. 4, the rearward end of the fluid or pneumatic cylinder is pivotally connected at opposite sides thereof to toggle driving arms 98 arranged such that from the position shown in FIG. 4, forward pivoting of the driving arms 98 urges the cylinder 92 forwardly or to the right and opposite pivoting of the driving arms urges the cylinder rearwardly or to the left. The pivotal stroke of the driving arms 98 is arranged so that with fluid, preferably air or some other gaseous fluid, in the cylinder 92 under pressure, preferably in the order of 40 pounds per square inch, forward pivoting of the driving arms 98 will move the cylinder axially forwardly and through the piston 94 and contained air pressure within the cylinder, will move the pusher tube 76 axially forwardly from its fully retracted position at the left of the star wheel 52 forwardly to the right through the star wheel and to the trimming station 64, with opposite movement of the driving arms 98 retracting the pusher tube or rod rearwardly to the left back to fully retracted position by abutting engagement of the cylinder with the cylinder abutment collar 78 on the pusher tube or rod. The reciprocal movement of the pusher tube 76 is, therefore totally through the fluid or air cushion or pressure within the cylinder 92 and if the pusher tube should meet an obstacle producing an obstructing force sufficient to exceed the pressure within the cylinder, the cylinder can collapse by compressing the air therein, that is, the cylinder being positively driven can continue forward movement to the right while the pusher tube becomes stationary causing the piston thereof to compass the air within the cylinder. Furthermore, by sensing the pressure of the air within the cylinder 92 through the pressure sensor 97 at the air supply line 96, when the pressure within the cylinder reaches a predetermined higher pressure indicating the obstructing force of sufficient magnitude, the entire trimmer can be automatically shut down, while at the same time, the dump valve 99 will exhaust air pressure above the predetermined higher pressure at least for cylinder pressure to stay below the predetermined higher pressure or lower.

The pusher tube or rod 76 is, therefore, guarded through this collapsing axial pressure reacting cylinder arrangement of the cylinder 92 against severe damage in the event an intervening obstructing force of sufficient magnitude is met during pusher rod forward movement at the feed station 54, between the feed station and the trimming station 64 or at the trimming station until the pusher rod is fully extended. Such an obstructing force of sufficient magnitude could be caused by improper positioning of an untrimmed can body 44 at the feed station 54 or a damaged or deformed can body being so positioned, some obstruction accidentally entering the space between the feed and trimming stations 54 and 64, some obstruction on the trimming mandrel 66 of the trimming station 64 preventing an untrimmed can body 44 being smoothly telescoped over such trimming mandrel by the pusher rod 76, or an untrimmed can body 44 being improperly positioned carried by the pusher rod 76 so that it is not positioned to be smoothly telescoped over the trimming mandrel 66 at the trimming station 64. Any of these or other obstructions could cause a sufficient obstructing force to cause collapse of the cylinder 92 and this would automatically terminate operation of the trimmer preventing serious damage to the pusher tube or rod 76 or various other components at the trimming station 64 to be hereinafter described, as well as automatically cause exhausting or dumping of excess higher air pressure preventing serious damage to the cylinder 92.

Also, it will be noted that the positioning relationship between the vacuum tube 68 and the pusher tube 76 is such that when the pusher tube is fully retracted or fully to the left as shown in FIG. 7, the ejector 88 contacts the ejector stop 74 on the vacuum tube 68 and is forced forwardly or to the right relative to the vacuum cup projecting therefrom as shown. When, hhowever, the pusher tube 76 is in any extended position relative to the vacuum tube 68, that is, sufficient that the vacuum cup 80 carries the ejector 88 away from contact with the ejector stop 74 of the vacuum tube 68, the ejector is free to move rearwardly or to the left relative to the vacuum cup and a slight resistance or rearward movement will cause such rearward movement of the ejector. This will place the ejector 88 in its rearward position relative to the vacuum cup 80 as shown in FIG. 6.

In operation of this feed and positioning mechanism assembly 32 or this portion of the trimmer, starting with the pusher tube 76 in fully retracted position as shown in FIG. 6, the star wheel 52 indexes positioning an untrimmed can body 44 at the feed station 54 ready for movement to the trimming station 64 for the trimming operation on the open end 48 thereof. At this time, the vacuum cup 80 is spaced from the untrimmed can body 44 and the ejector 88 is abutting the ejector stop 73 on the end of the vacuum tube 68 closing the ejector vacuum opening 90 and projecting axially forwardly or to the right from the vacuum cup. This, of course, is the ejecting position of the ejector 88 in which the ejector was automatically placed upon the pusher tube 76 returning to its fully retracted position at the termination of the immediately preceding cycle.

At this stage, therefore, with the pusher tube 76 in fully retracted position ready for the start of a complete cycle, the vacuum supply to the vacuum cup 80 is shut off or closed by the ejector 88 through the automatic positioning thereof and this vacuum control is immediately adjacent the vacuum cup. Furthermore, both the vacuum cup 80 and its internal ejector 88 are slightly spaced axially rearwardly from, but exactly axial aligned with the untrimmed can body 44 that has been moved into the feed station 54. Air pressure of approximately 40 psi is contained within the cylinder 92 so that an air cushion of determined pressure is maintaining the proper positioning between the cylinder and the pusher tube 76 with the rearward end of the cylinder axially abutting the cylinder abutment collar 78 on the pusher tube.

Starting a cycle, the driving arms 98 begin forward pivotal movement to the right as shown in FIG. 4, moving the cylinder 92 axially forward carrying the pusher tube 76 axially forward. The axially projecting ejector 88 first contacts the closed end 46 of the untrimmed can body 44 and since the rearward end of the ejector has moved axially away from the ejector stop 74 of the vacuum tube 68, the resistance of the untrimmed can body moves the ejector axially rearwardly telescoping the same fully within the vacuum cup 80. Virtually simultaneously, the vacuum cup 80 contacts the closed end 46 of the untrimmed can body 44 and with the ejector 88 spaced axially rearwardly relative to the vacuum cup 80, a vacuum supply is received from the vacuum tube 68 through the now open ejector vacuum openings 90 and into the vacuum cup 80, thereby vacuum gripping the untrimmed can body 44. This effective vacuum action takes place virtually instantaneously with the rearward telescoping of the ejector 88 and the opening of the vacuum openings 90 since no lengthy vacuum lines are required to be exhausted in view of the vacuum control being immediately adjacent the vacuum cup 80.

Figure 8:
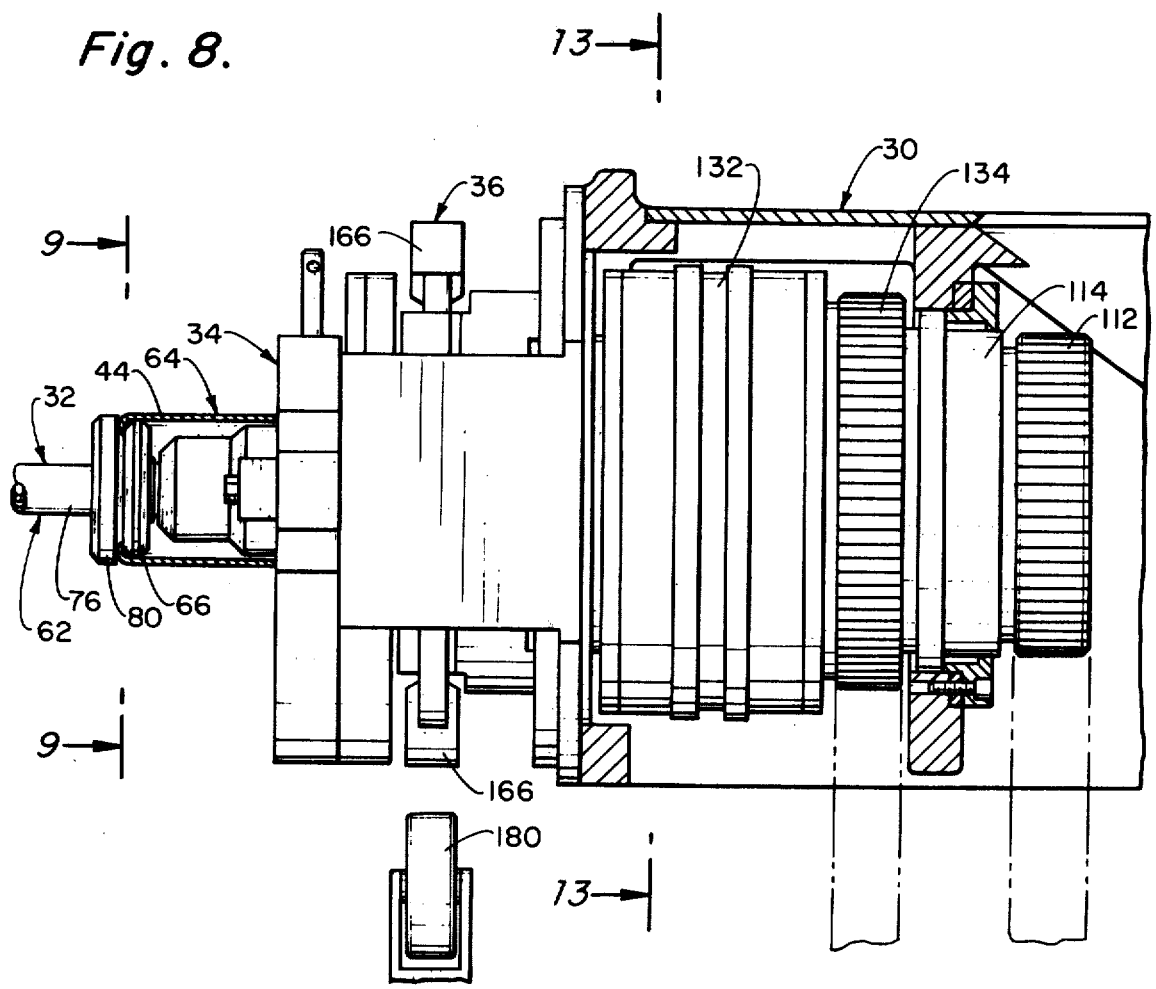
FIG. 8 is an enlarged, fragmentary, vertical sectional view looking in the direction of the arrows 8-8 in FIG. 2 and showing a can body positioned over the trimming mandrel by the pusher mechanism as during a trimming operation.
Figure 9:
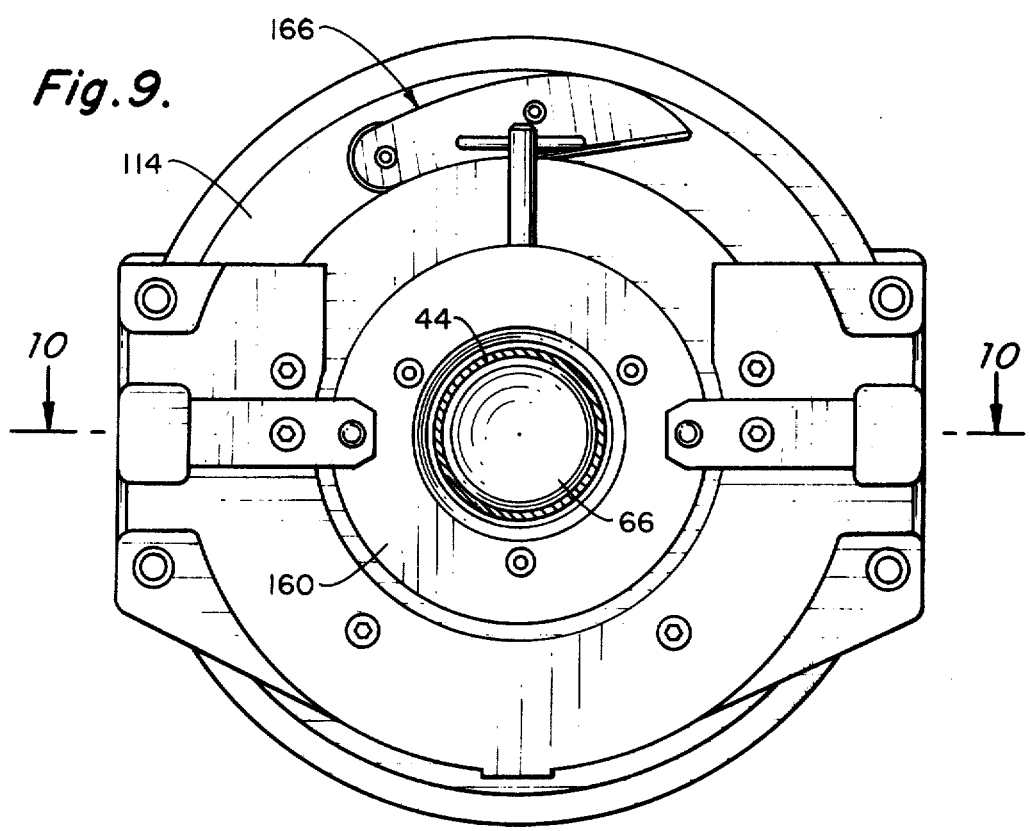
FIG. 9 is an enlarged, vertical sectional view looking in the direction of the arrows 9—9 in FIG. 8.

Continued forward or feed stroke movement of the pusher tube 76 forces the untrimmed can body 44 with its open end 48 first from its nesting in the star wheel 52 at the feed station 54 axially to the trimming station 64 and ultimately over the trimming mandrel 66 to the position shown in FIG. 8. In this pushing movement of the pusher tube 76, complete control of the untrimmed can body 44 is maintained by the described vacuum gripping thereof and as the untrimmed can body is forced to completely telescope the trimming mandrel 66, the final fully extended positioning of the cylinder 92 by the driving arms 98 is slightly beyond that necessary for the pusher tube 76 to fully telescope this untrimmed can body 44 over the trimming mandrel 66. This, therefore, moves the cylinder 92 slightly axially forwardly relative to the pusher tube 76 to the positioning of the pusher tube piston 94 shown by the phantom line 100 and the positioning of the cylinder abutment collar 78 of the pusher tube shown at phantom line 102 in FIG. 5 thereby slightly compressing the air within the cylinder and maintaining axial pressure against the untrimmed can body 44 to maintain telescoped positioning thereof on the trimming mandrel 66. Although this increase in pressure within the cylinder 92 will be sensed by the cylinder pressure sensor 97, it is not a sufficient increase to cause the cylinder pressure sensor to interrupt or shut down operation of the trimmer or the dump valve 99 to exhaust excess air pressure.

After the can body trimming operation, to be hereinafter described, the driving arms 98 begin to pivot rearwardly carrying the cylinder 92 rearwardly abutting the cylinder abutment collar 78 of the pusher tube 76 to likewise begin movement of the pusher tube rearwardly, this being the start of the return or retraction stroke. Due to the vacuum gripping of the vacuum cup 80, and now trimmed can body 58 is withdrawn from the trimming mandrel 66 and the trimming station 64. The pusher tube 76 thereby moves the trimmed can body 58 from the trimming station 64 back to the feed station 54 renested within the star wheel 52, the pusher tube approaching the end of its retraction stroke and its fully retracted position.

As shown in FIG. 7, as the pusher tube 76 is finally moved into its fully retracted position in this retraction stroke, the ejector 88 contacts the vacuum tube ejector stop 74 which moves the ejector forwardly relative to the vacuum cup 80 causing the ejector to contact the closed end 46 of the trimmed can body 58. As the pusher tube 76 finally moves in to its fully retracted position, the ejector 88 forces the trimmed can body 58 axially from vacuum gripping by the vacuum cup 80 while simultaneously closing off the vacuum supply to the vacuum cup from the vacuum tube 68 through the relative ejector forward movement. The trimmed can body 58 therefore, is now free of control by the pusher tube 76 and the star wheel 52 may be indexed to bring the next untrimmed can body 44 into the feed station 54 ready for the cycling of the mechanism.

As hereinbefore alluded to, if the untrimmed can body 44 and pusher tube 76 during the forward or feed stroke should meet one of the various possible obstructing forces hereinbefore described, the pusher tube forward movement may be stopped with the forward movement of the cylinder 92 continuing. If this obstructing force is sufficient to overcome the 40 psi pressure within the cylinder 92, the cylinder will begin to collapse, that is, relative axial movement between the pusher tube and the cylinder, thereby increasing the cylinder internal air pressure. Once this cylinder internal air pressure reaches a predetermined amount, say by relative movement between the pusher tube 76 and cylinder 92 to the phantom line positioning of the pusher tube piston 94 as shown at 103 in FIG. 6, the cylinder pressure sensor 97 senses this increased pressure to the predetermined pressure and automatically, through usual electrical connections, shuts down the trimming equipment while the dump valve 99 exhausts the excess air pressure. This, thereby, guards the trimming equipment against extensive damage.

Furthermore, if the pusher tube vacuum cup 80 ever wrongly contacts an untrimmed can body 44, or the can body closed end 46 is split or broken from improper forming, or for this or some other reason loses its vacuum gripping of the can body at any time throughout the cycling when there should be vacuum gripping by the vacuum supply being open, the resulting unusual continuous vacuum flow will be sensed by the vacuum flow sensor 72 and the pusher mechanism 62 and/or the entire trimmer shut down. Thus, this provides a further safety feature preventing component damage or improper operation.

TRIMMING MECHANISM ASSEMBLY

The trimming mechanism assembly 34 is shown in general trimmer location in FIGS. 1 and 2, and is best seen in detail in FIGS. 8 through 15. Generally, the prime components of the trimming mechanism assembly 34 or those components which actually perform the metal trimming of an untrimmed can body 44 are an outer annular anvil or cutter ring 104 having a radially extending cutting surface 106 and an internal trimmer knife 108 having a radially extending cutting surface 110, these components in can body trimming position being shown in FIGS. 10, 12 and 14. Furthermore, important to certain of the principles of the present invention, the cutter ring 104 is stationary, as is the untrimmed can body 44 during the trimming operation, while the trimmer knife 108 is rotatable about its central knife axis, the knife and its axis are rotatable about a central axis of the trimming mandrel 66 and the untrimmed can body 44 being trimmed, and is radially movable outwardly to the trimming position shown as well as movable radially inwardly of the walls of the untrimmed can body, all of which is accomplished by structure to be described immediately below.

Figure 10:
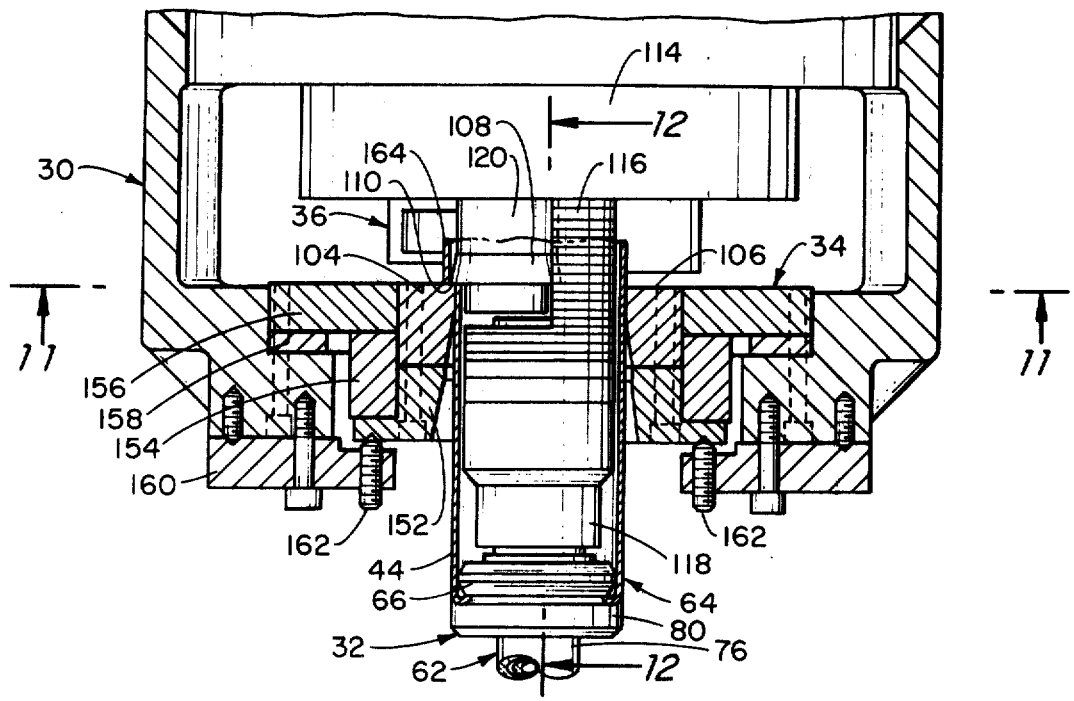
FIG. 10 is a fragmentary, horizontal sectional view looking in the direction of the arrows 10—10 in FIG. 9.
Figure 12:
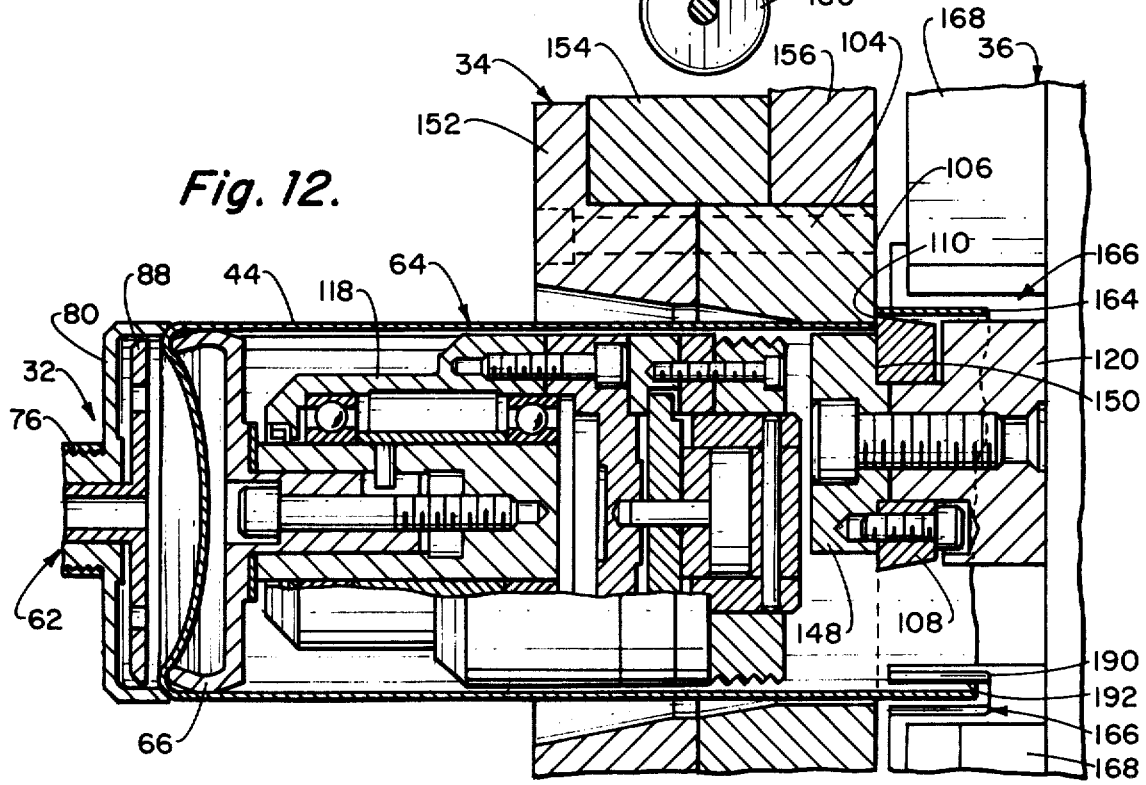
FIG. 12 is a fragmentary, vertical sectional view looking in the direction of the arrows 12—12 in FIG. 10.
Figure 13:
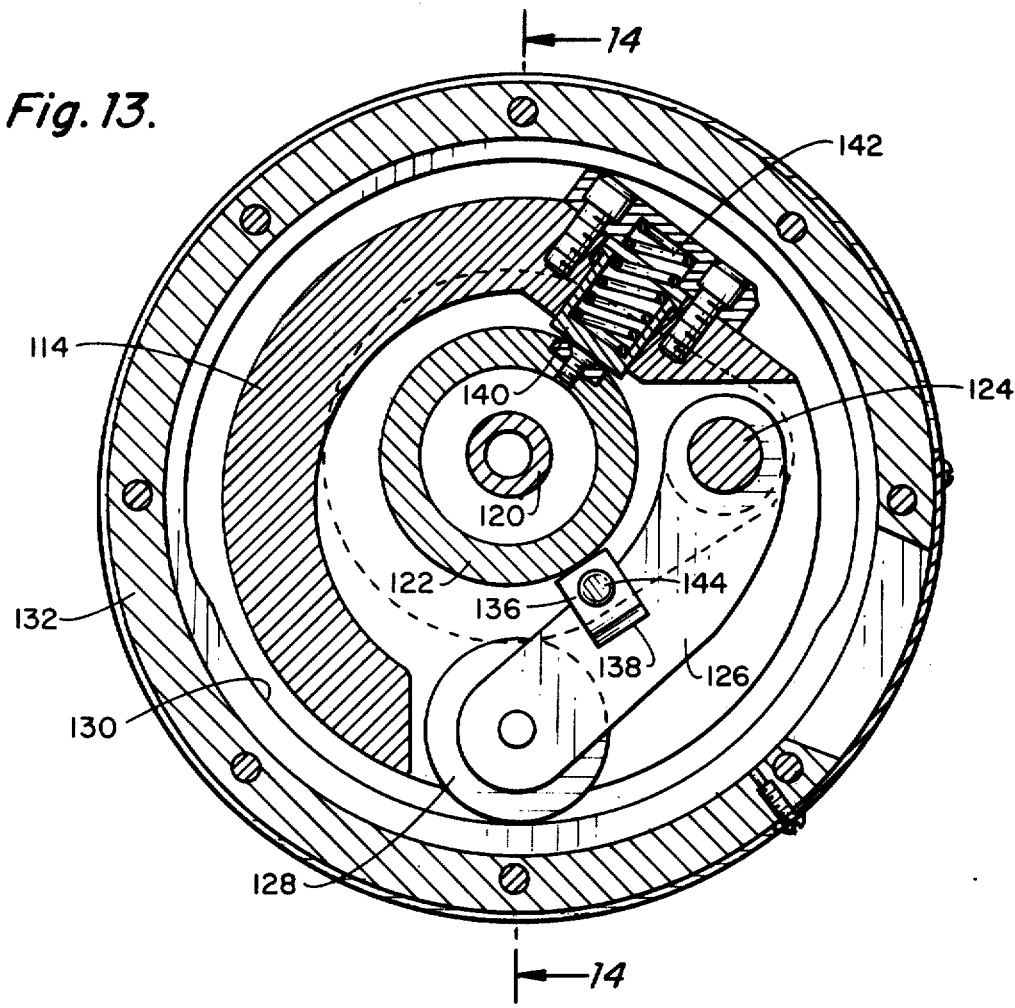
FIG. 13 is an enlarged, vertical sectional view looking in the direction of the arrows 13—13 in FIG. 8.
Figure 15:
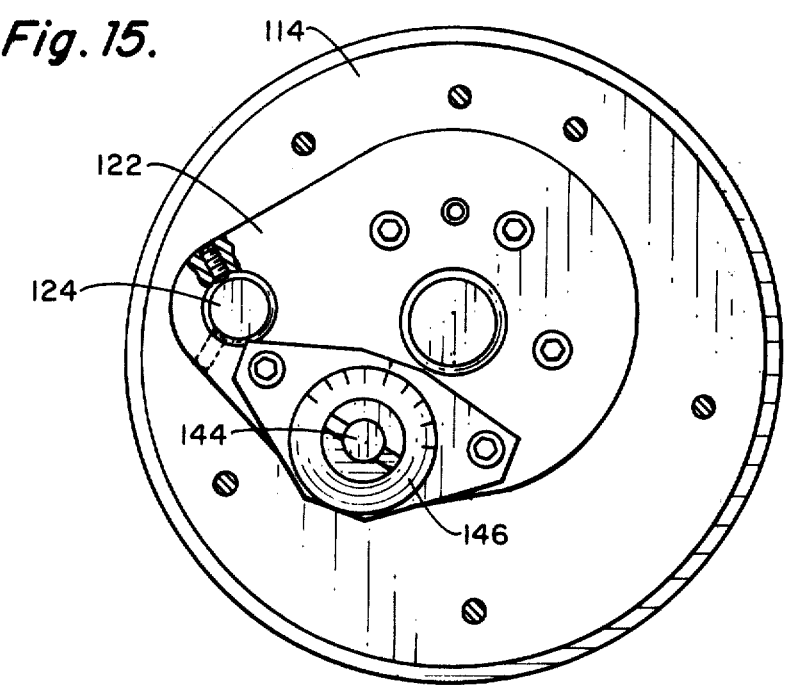
FIG. 15 is a fragmentary, vertical sectional view looking in the direction of the arrows 15—15 in FIG. 14.

In addition to the components hereinbefore pointed out, the trimming mechanism assembly 34 includes a main drive gear 112 rotatably driving a cutter and nipper frame 114 turning on the main frame 30 and rotatable about the central axis of the trimming mandrel 66. The cutter and nipper frame 114 terminates at the left as shown or at the trimming mandrel 66 first in an externally threaded scrap removal cylinder 116, a portion of which lies radially inwardly of the scrap disposal assembly 36, and finally in an end cap 118 which telescopes and journals a portion of the trimming mandrel 66 (FIGS. 10, 12 and 14). The trimmer knife 108 is secured to a knife shaft 120 in a manner to be hereinafter particularly described, with the knife shaft being freely journalled within a knife frame 122, which, in turn, is pivotally connected to the cutter and nipper frame 114 by securement to an axially pivotal control rod 124 pivotal on the cutter and nipper frame 114 (FIGS. 13, 14 and 15). As shown in FIGS. 14, and 15, the right end of the knife frame 122 is mounted on the right end of the control rod 124 and although the left end of the control rod is shown in FIG. 14 removed to expose other important parts of the mechanism, the left end of the knife frame 122 is similarly connected to the control rod.

Thus, the trimmer knife 108, knife shaft 120 and knife frame 122 are pivotally mounted on the cutter and nipper frame 114 for outward and inward and pivotal movement of the trimmer knife relative to the cutter and nipper frame about the axis of the control rod 124 which is widely offset from the central axis of the cutter and nipper frame. At the same time, the cutter and nipper frame 114 is rotatable about its central axis corresponding with the central axis of the trimming mandrel 66 being driven by the main drive gear 112 and carrying the trimmer knife 108 through the knife shaft 120 and the knife frame 122 in this rotatable movement about the trimming mandrel central axis. In this manner, the trimmer knife 108 which is freely rotatable about its own central axis may be pivoted from its inner position inwardly of the stationary cutter ring 104 and an untrimmed can body 44 projecting through said cutter ring radially outwardly to cutting or trimming position extending radially through the untrimmed can body and against the cutter ring for rotation about the cutter ring to trim the entire circumferential length of the untrimmed can body. At the same time, the trimmer knife 108 may be retained inwardly in its retracted position free of the cutter ring 104 while still being constantly rotated about the central axis of the trimming mandrel 66 by the main drive gear 112 and the cutter and nipper frame 114.

The pivotal control of the trimmer knife 108 between its inward retracted and outward cutting or trimming positions is regulated by the mechanism shown in FIGS. 8, 13 and 14, such mechanism including a control arm 126 pivotal about the control rod 124 at one end and having a cam follower 128 rotatably mounted at the other end. The cam follower 128 bears outwardly against an internal cam surface 130 of a separately rotating cam ring 132, the cam ring being constantly rotatably driven by a cam gear 134 (FIGS. 8 and 14) at a different speed than the cutter and nipper frame 114 rotation, but about the central axis of the trimming mandrel 66. Intermediate the length of the control arm 126, an axially extending wedge 136 having an angled wedge surface 138 is received axially through an appropriate notch of the control arm and bears radially inwardly against the outer circumferential surface of the knife frame 122 so that the pivotal positioning of the trimmer knife 108, knife shaft 120 and knife frame 122 about the axis of the control rod 124 is determined by the control arm cam follower 128 and the cam ring internal cam surface 130. As shown in FIG. 13, the knife frame 122 is resiliently urged and maintained against and controlled by the wedge 136 through a radially movable plunger 140 mounted on the cutter and nipper frame 114 urged radially inwardly by a coiled spring 142.

Thus, the cam ring 132 controls the outward and inwardly pivoting of the trimmer knife 108 while this trimmer knife is being constantly rotated about the central axis of the trimming mandrel 66 through the cutter and nipper frame 114. With the particular form of internal cam surface 130 on the cam ring 132 and the particular form of trimmer of the present invention, the cam ring 132 constantly rotates two complete revolutions for every three complete revolutions of the constantly rotating cutter and nipper frame 114 about the central axis of the trimming mandrel 66 so that the trimmer knife 108 is pivoted outwardly into can body trimming position for one revolution of the cutter and nipper frame 114 and is pivoted inwardly free of any can body trimming action for two revolutions of the cutter and nipper frame. Therefore, three revolutions of the cutter and nipper frame 114 constitutes a cycle of the trimmer of the present invention.

As shown in FIGS. 14 and 15, the wedge 136 radially between the control arm 126 and the knife shaft 120 is connected to the end of an axially extending cam positioning rod 144, the opposite end of said rod being threadably engaged in an adjustment dial 146 rotatable in the end of the knife frame 122. With such structure, rotation of the adjustment dial 146 in one direction will move the wedge 136 axially in one direction relative to the control arm 126, and rotation of the adjustment dial in the opposite direction will move the wedge axially opposite relative to the control arm. Since the wedge 136 contacts the control arm 126 through the angled wedge surface 138, this axial adjustment movement of the wedge will move the knife shaft 120, knife frame 122 and trimmer knife 108 radially inwardly and outwardly relative to the central axis of the trimming mandrel 66. In this manner, therefore, the radial penetration of the trimmer knife 108 through the walls of the untrimmed can body 44 and relative to the outer stationary cutter ring 104 can be adjustably controlled.

It has been found that with the trimmer components as shown and described, penetration of the walls of the untrimmed can bodies 44 by the trimmer knife 108 to ½ to ¾ thickness of the walls will produce a satisfactory trimming operation. It is preferred, however, to penetrate the can body walls completely and approximately one-thousandth inches radially beyond by the trimmer knife 108 where the can walls have a metal thickness of approximately eight-thousandths inches to insure a satisfactory can body trimming operation.

Referring to FIGS. 12 and 14, and more particularly to the unique mounting of the trimmer knife 108 on the knife shaft 120, it will be noted that the trimmer knife is annular and presents the radial cutting surface 110 thereof axially against the cutting surface 106 of the cutter ring 104, that is, to the left as shown in FIGS. 12 and 14. The end of the knife shaft 120 is provided with a mounting cap 148 having a radially extending mounting surface 150 axially facing the trimmer knife cutting surface 110. In the assembly as shown, the trimmer knife 108 is selectively removably tightly secured to the mounting cap 148 with the trimmer knife cutting surface 110 tightly axially abutting the mounting cap mounting surface 150, and the mounting cap 148 is, in turn, selectively removably tightly secured abutting the end surface of the knife shaft 120.

Thus, since the knife shaft 120, although controllably movable radially inwardly and outwardly during the cycling for movement of the trimmer knife 108 between its inward retracted and outward trimming positions as hereinbefore described, always remains in a set axial positioning or always extends the same set axial distance or extent. With the mounting cap 148 in the assembly always tightly abutting the end surface of the knife shaft 120 and the trimmer knife cutting surface 110 in the assembly always abutting the mounting cap mounting surface 150, the important trimmer knife cutting surface 110 will always extend radially in the same axially located radial plane or at the same exact axial location. This means that with the described assembly, the trimmer knife cutting surface 110 will always be at the exact same axial location regardless of the axial thickness of the trimmer knife 108.

The importance of the foregoing relative to the mounting of the trimmer knife 108 is that during use of the trimmer, the cutting surface 110 of the trimmer knife 108 repeatedly requires surface grinding since this is the portion of the trimmer knife with the cutting surface 106 on the cutter ring 104 that is performing the can body wall metal trimming operation. When regrinding of the cutting surface 110 of the trimmer knife 108 is required, it is merely necessary to remove the mounting cap 148 from the knife shaft 120, remove the trimmer knife 108 from the mounting cap 148, regrind the trimmer knife cutting surface 110, and reassemble the various components as described, which, most importantly, will position the reground trimmer knife cutting surface 110 at the exact same axial location and regardless of the trimmer knife 108 now being slightly axially narrower. Using the trimmer knife cutting surface 110 as the mounting reference surface as described through axial abutment of this trimmer knife cutting surface against a mounting surface always axially located at the exact same axial location, such mounting surface being the mounting cap mounting surface 150, the trimmer knife 108 in its unique assembly with the mounting cap 148 is always quickly removable and replaceable after trimmer knife cutting surface 110 grinding without the danger of altering the alignment of the trimmer knife cutting surface with the required matching cutting surface 106 of the cutter ring 104. The removal and replacement of the trimmer knife 108 can, therefore, be accomplished in a minimum of time, a far less time than has heretofore been possible with prior trimmer constructions.

A somewhat similar unique and advantageous mounting of the stationary cutter ring 104 on the main frame 30 is also provided according to the principles of the present invention as is best seen in FIGS. 10 and 12. As shown, the cutter ring 104 presents its radially extending and axial facing cutting surface 106 axially against the trimmer knife cutting surface 110 when the trimmer knife is in its outward can body wall trimming positioning. Thus, if the cutting surface 110 of the trimmer knife 108 is always in a set predetermined axial position, the facing cutting surface 106 of the cutter ring 104 must likewise always be at an exact predetermined axial positioning.

As shown, axially opposite the cutter ring cutting surface 106, the cutter ring 104 is secured axially abutting a generally L-shaped cross-section, mounting ring 152, a radially outwardly extending leg portion of the mounting ring radially outwardly of the cutter ring 104 also axially abutting a compensating spacer ring 154. The compensating spacer ring 154 is, except for its abutments, axially slideable relative to both the cutter ring 104 and mounting ring 152 extending axially radially adjacent portions of both. Intermediate the cutter ring 104, the compensating spacer ring 154 axially abuts a register ring 156 telescoping and radially outwardly abutting an axial portion of the cutter ring 104.

The register ring 156 by its inward radial abutment with the cutter ring 104 radially positions the cutter ring in exact location relative to the other components at the trimmer station 64, and is, in turn, radially outwardly recess registered with the main frame 30. At the same axial side of the register ring 156 with which its abuts the compensating spacer ring 154, the register ring axially abuts a register spacer ring 158 which, in turn, axially abuts the main frame 30, the register ring 156 and register spacer ring 158 being secured to the main frame 30. To complete the unique mounting assembly of the cutter ring 104, a clamping ring 160 is secured axially abutting the main frame 30 with a portion extending radially inwardly into axial alignment with a portion of the mounting ring 152, there being radially adjustable clamping studs 162 extending axially through the clamping ring 160 and adjustable tightly axially against the mounting ring 152.

With this described assembly and with the various components remaining with their exact same respective sizes, the cutter ring 104 will always be positioned in the exact same radial and axial location, and particularly, the cutting surface 106 of the cutter ring 104 will always be positioned in the same axial location or radial plane and relative to the cutting surface 110 of the trimmer knife 108 with which it must cooperate to accomplish the can body wall metal trimming operation. Obviously, the cutter ring 104 will always be retained in the same radial location by the register ring 156, but more important for purposes of the present invention, the cutter ring cutting surface 106 will always be retained in the same axial location and relative to the trimmer knife 108 by the cutter ring clamping to the mounting ring 152, the abutment of the mounting ring with the compensating spacer ring 154 and the abutment of the compensating spacer ring with the register ring 156 which is clamped in a predetermined axial position on the main frame 30. If nothing is altered, this exact axial positioning of the cutter ring cutting surface 106 will remain by the tight clamping of the clamping studs 162 of the clamping ring 160 against the mounting ring 152, but just as with the cutting surface 110 of the trimmer knife 108, the cutting surface 106 of the cutter ring 104 requires periodic grinding and if all of the other components of the assembly remain the same, the grinding of the cutter ring cutting surface 106 will move this cutting surface axially away relative to the trimmer knife cutting surface.

Thus, according to the principles of the present invention and with the unique assembly shown and described, when the cutter ring 104 is removed for grinding the radial cutting surface 106 thereof, the compensating spacer ring 154 is also removed and a radially extending surface thereof is ground an exact equivalent amount. For convenience, it is preferred to form the cutter ring 104 and the compensating spacer ring 154 with the exact same axial dimensions so that these two rings can be positioned with the compensating spacer ring 154 telescoping the cutter ring 104 on the same grinder and with the radially extending surfaces thereof radially aligned so that the grinding of the cutter ring cutting surface 106 will automatically grind the aligned radially extending surface of the compensating spacer ring 154 the exact same amount. In any event, with the exact same grinding of the cutter ring cutting surface 106 and one of the radially extending surfaces of the compensating spacer ring 154, when the various components of the assembly are reassembled and axially clamped by the clamping studs 162 of the clamping ring 160, the now reground cutting surface 106 of the cutter ring 104 will be returned to its exact same axial position and relative to the cutting surface 110 of the trimmer knife 108. Therefore, the realignment of the cutting surface 106 of the cutter ring 104 after regrinding is automatic with this unique assembly, and the disassembly, grinding and reassembly may be accomplished without time consuming realignment being necessary and the overall operation can be conducted in far less time than has heretofore been possible with prior trimmer constructions.

In operation of the trimming mechanism assembly 34 constituting a portion of the trimmer of the present invention, the pusher tube 76 of the pusher mechanism 62 as previously described telescopes an untrimmed can body 44 over the trimming mandrel 66 at the trimming station 64 into the position shown in FIGS. 8, 10, 12 and 14, but during this untrimmed can body telescoping, although the untrimmed can body extends through the cutter ring 104, the trimmer knife 108 is in its radially inward retracted position by the cam follower 128 of the control arm 126 contacting a portion of the internal cam surface 130 of the cam ring 132 which is of maximum radial dimension. Once the pusher mechanism 62 completes this axial telescoping of the untrimmed can body 44 over the trimming mandrel 66 into position extending through the cutter ring 104, the pusher mechanism retains the untrimmed can body axially against the trimming mandrel 66 with the described slightly increased air pressure of the pneumatic cylinder 92, and also preferably the vacuum gripping from the vacuum cup 80 as likewise described. Since the pusher tube 76 including its vacuum cup 80 of the pusher mechanism 62 are non-rotatable, this axial pressure against and vacuum gripping of the untrimmed can body 44 retains both the untrimmed can body and the trimming mandrel 66 stationary throughout the trimming operation which, particularly with the stationary cutter ring 104, adds greatly to the accuracy and efficiency of the trimming operation.

Immediately following the final positioning of the untrimmed can body 44 over the trimming mandrel 66, the cam follower 128 of the control arm 126 arrives circumferentially at and moves radially inwardly onto the lesser radial dimensioned portion of the internal cam surface 130 on the cam ring 132 thereby forcing the knife frame 122 and knife shaft 120 pivotally radially outwardly carrying the trimmer knife 108 radially outwardly to initially pierce the walls of the untrimmed can body 44 in the manner shown in FIGS. 10, 12 and 14. Since the cutter and nipper frame 114 is continuously rotating about the central axis of the trimming mandrel 66 and relative to the main frame 30, as the trimmer knife 108 pierces the walls of the stationary untrimmed can body 44 it is carried circumferentially around the can body walls in approximately one complete circumference, it being pointed out that one complete circumferential movement of the trimmer knife 108 would not be required in view of the fact that the trimmer knife is circular so as to span a circumferential distance. This circumferential movement of the trimmer knife 108 with the trimmer knife cutting surface 110 acting against the stationary cutter ring cutting surface 106 will sever the desired can body wall portion from the can body open end 48 ultimately resulting in a scrap ring 164 being formed by the severed can body wall portion which is disposed of in a manner to be hereinafter described. Immediately after the severing of the scrap ring 164 from the untrimmed can body 44 so as to form the trimmed can body 58, the pusher mechanism 62 through the previously described vacuum gripping withdraws the now trimmed can body 58 from the trimming mandrel 66 and from the trimming station 64 returning it to the feed station 54 while the trimmer knife 108 is retracted radially inwardly as controlled by the internal cam surface 130 of the cam ring 132.

SCRAP DISPOSAL ASSEMBLY

Figure 11:
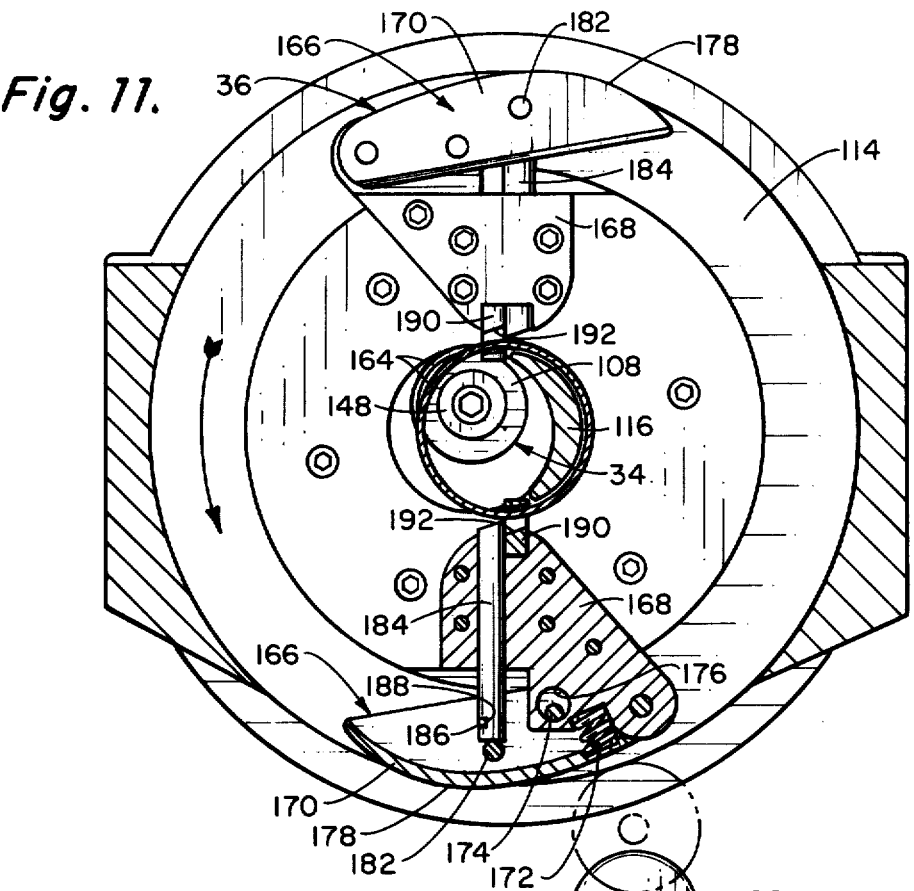
FIG. 11 is a vertical sectional view looking in the direction of the arrows 11—11 in FIG. 10.

The general location of the scrap disposal assembly 36 in the overall trimmer assembly is shown in FIGS. 2, 8, 10 and 14, and the particulars thereof are shown in detail in FIG. 11. Referring particularly to FIG. 11, the scrap disposal assembly 36 includes preferably diametrically opposite nipper assemblies generally indicated at 166 mounted on the cutter and nipper frame 114 and, therefore, constantly rotatable with the cutter and nipper frame about the central axis of the trimming mandrel 66 at an axial location axial adjacent the cutting surface 106 of the cutter ring 104. The nipper assemblies 166 are, therefore, radially outwardly of a portion of the externally threaded scrap removal cylinder 116 previously described (FIG. 14) and extend generally radially outwardly from the location of the scrap rings 164 being severed from the untrimmed can bodies 44 at the trimming station 64.

As shown in FIG. 11, each of the nipper assemblies 166 is substantially the same and each includes a frame portion 168 secured to the cutter and nipper frame 114 so as to be stationary relative to said frame, although constantly rotatable therewith about the central axis of the trimming mandrel 66. A nipper actuator 170 is pivotally connected to each of the frame portions 168 normally urged resiliently outwardly by springs 172 against the frame portions 168 and controlled in the limits of their inward and outward movements by pins 174 received through the nipper actuators and through enlarged openings 176 of the frame portions. The nipper actuators 170 have radially outwardly facing and generally circumferentially extending camming surfaces 178 axially aligned with an actuating roller 180 movable by appropriate controls well known to those skilled in the art upwardly and downwardly below the cutter and nipper frame 114 at this nipper assembly location.

An actuator pin 182 is mounted in each of the nipper actuators 170 peripherally abutting outer ends of radially inwardly extending and radially reciprocal nipper rods 184 radially slideably received through the frame portions 168. The nipper rods 184 are retained generally radially movable with the pivotal movements of the nipper actuators 170, but slightly pivotal relative thereto, by keeper pins 186 of the nipper actuators 170 received through notches 188 of the nipper rods 184. The inner or cutting ends of the nipper rods 184 upon pivotal movement of the nipper actuators 170 and radial inward and outward reciprocation of the nipper rods 184, slide radially along scrap positioners 190 circumferentially covering scrap slots 192 of the scrap positioners when the nipper rods 184 are moved inwardly and being free and radially outwardly of the scrap slots when the nipper rods are moved outwardly. As shown in FIG. 11, the scrap slots 192 extend circumferentially through the scrap positioners 190 and as shown in FIGS. 12 and 14, such scrap slots open axially at least in the axial direction toward the cutter ring 104 which is in the axial direction from which the untrimmed can bodies 44 are inserted over the trimming mandrel 66 and through the cutter ring.

Thus, as best seen in FIGS. 11 and 12, as the untrimmed can bodies 44 are moved to the trimming station 64 and telescoped fully over the trimming mandrel 66 ready for the trimming operation as hereinbefore described, the wall portions at the open ends 48 of the untrimmed can bodies are at least partially axially received in the scrap slots 192 of the nipper assemblies 166, the actuating roller 180 at this time being in its lowered position and the trimmer knife 108 being in its inward retracted position. At this time, the scrap positioners 190 being secured to the frame portions 168 are constantly rotating about the central axis of the trimming mandrel 66 with the cutter and nipper frame 114 and during such movement, the untrimmed can bodies 44 remain stationary as described while the scrap positioners 190 rotate with the end portions of the untrimmed can bodies remaining in the scrap slots 192. This relative movement continues during the outward camming of the trimmer knife 108 and the axial can body trimming operation to produce the now trimmed can bodies 58 and the scrap rings 164.

Immediately upon a trimming operation being completed on a particular untrimmed can body 44 producing a particular scrap ring 164, however, this scrap ring 164, being free of the stationary now trimmed can body 58, now rests fully on and begins rotation with the nipper assemblies 166. At this time the actuating roller 180 is moved upwardly from the position shown in full lines to the position shown in phantom lines in FIG. 11. As the first of the constantly rotating nipper assemblies 166 arrives at the actuating roller 180, the actuating roller rolls circumferentially along the nipper actuator camming surface 178 pivoting the nipper actuator 170 radially inwardly and moving the nipper rod 184 inwardly to slide radially along the scrap positioner scrap slot 192 severing the scrap ring 164 at this particular location. As soon as that nipper assembly 166 moves circumferentially beyond the location of the actuating roller 180, the nipper actuator 170 pivots back radially outwardly withdrawing the nipper rod 184.

Ultimately the other nipper assembly 166 carrying the now rotating scrap ring 164 therewith arrives at the location of the actuating roller 180 and the same severing operation is repeated with the actuating roller 180 being lowered downwardly to its non-actuating full line position of FIG. 11 after the second severing or nipping operation. Thus, each particular scrap ring 164 is severed or nipped into two separate pieces in one complete revolution of the nipper assemblies 166, each nipper assembly performing its scrap severing or nipping operation at a different time spaced by one half revolution of the cutter and nipper frame 114. Furthermore, as the scrap ring 164 is cut into the separate pieces, these pieces are immediately thrown outwardly by centrifugal force away from the can body trimming components due to the scrap ring rotation. Referring to FIGS. 1 and 2, the severed portions of the scrap ring 164, after expending of the centrifugal force, fall downwardly by gravity into the scrap chute 194 and ultimately therethrough outward of the trimmer into an appropriate receptacle.

The purpose of the peripheral threading of the scrap removal cylinder 116 which lies radially inwardly of the nipper assemblies 166 and is constantly rotating with the cutter and nipper frame 114 is for the purpose of tending to move the scrap ring 164 axially away from the stationary cutter ring 104 and further into the scrap slots 192 of the scrap positioners 190, if at any time after separation from the can, the scrap ring does not attain the rotational speed of the cylinder 116, such as if the scrap ring or any portion of it adheres to or is thrown into the stationary cutter ring 104. In other words, this threaded peripheral surface of the scrap removal cylinder 116 is threaded in the direction such that the threads appear to thread axially away from the particular now trimmed can body 58 and toward the closed sides of the scrap slots 192 in the scrap positioners 190 during the constant rotation of the cutter and nipper frame 114 so that the particular scrap ring 164, while it is stationary or rotating at less speed than the scrap removal cylinder 116 and becomes disoriented so as to contact this cylinder, tends to be urged toward and more deeply into the scrap slots 192 effectively positioning the scrap ring fully within the scrap slots for severing thereof and tending to prevent the scrap ring or resulting severed scrap pieces from moving in the opposite axial direction where they could interfere with the various can body trimming components and positioning surfaces. Also, this threaded peripheral surface of the scrap removal cylinder 116 which is constantly covered with oil during operation of the trimmer forms an oil break preventing the several scrap pieces from sticking thereto and allowing the same to separate from the cylinder 116 by centifugal force or gravity and to fall downwardly into the scrap chute 194.

OVERALL OPERATION OF TRIMMER

Referring to the diagrammatic views of FIGS. 16 through 27, a single overall cycle of the trimmer will be described which is complete in exactly three revolutions of the cutter and nipper frame 114, as previously pointed out.

Starting with FIG. 16, the star wheel 52 has indexed and is positioning an untrimmed can body 44 at the feed station 54 axially aligned with the pusher mechanism 62. The pusher tube 76 of the pusher mechanism 62 is fully withdrawn or retracted so as to be fully to the left as shown, and the ejector 88 has contacted the ejector stop 74 forcing the ejector to extend into ejecting position projecting from the vacuum cup 80. Thus, the pusher tube 76 is exactly in its fully retracted position and reversing ready to start a cycle.

As shown in FIG. 17, the pusher tube 76 has started its feed stroke and the vacuum cup 80 thereof has contacted the closed end 46 of the untrimmed can body 44. During this contact of the pusher tube vacuum cup 80 with the untrimmed can body 44, the can body closed end 46 as well as the pusher tube momentum has forced the ejector 88 rearwardly, or to the left, relative to the vacuum cup, so that the ejector vacuum opening 90 is open into communication with the vacuum tube 68. This, thereby, immediately causes tight vacuum gripping of the pusher tube vacuum cup 88 of the untrimmed can body 44.

As shown in FIG. 18, the pusher tube 76 continues its forward feed stroke movement to the right pushing the untrimmed can body 44 from the star wheel 52 and telescoping the untrimmed can body fully over the trimming mandrel 66 at the trimming station 64. It will be noted that to this point in the cycle, although the cutter and nipper frame 114 is continuously rotating, the trimmer knife 108 remains retracted radially inwardly and the nipper assemblies 166 remain inactive not actuated. The axial telescoping of the untrimmed can body 44 over the trimming mandrel 66 at the trimming station 64 by the pusher tube 76 has, however, inserted the untrimmed open end 48 of the untrimmed can body 44 through the cutter ring 104 and into the scrap positioners 190 (FIGS. 24, 25 and 26) of the nipper assemblies 166. The untrimmed can body 44 and the trimming mandrel 66 remain circumferentially stationary held by the vacuum gripping and axial pressure of the pusher tube 76, the cutter ring 104 remains at all times stationary, and the retracted trimmer knife 108 and non-actuated nipper assemblies 166 continue to rotate in view of the continuous rotation of the cutter and nipper frame 114.

Figure 19:
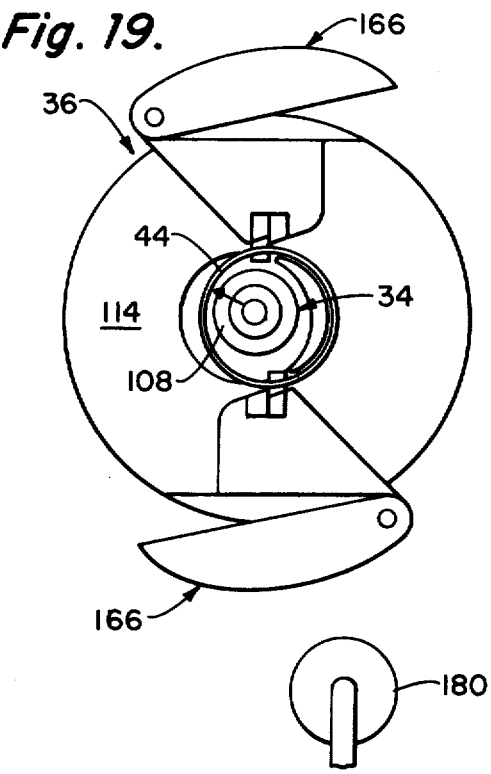
FIGS. 19, 20, 21 and 22 are diagrammatic views looking in the direction of the arrows 19—19 in FIG. 18 and showing the actual can body trimming operation.
Figure 20:
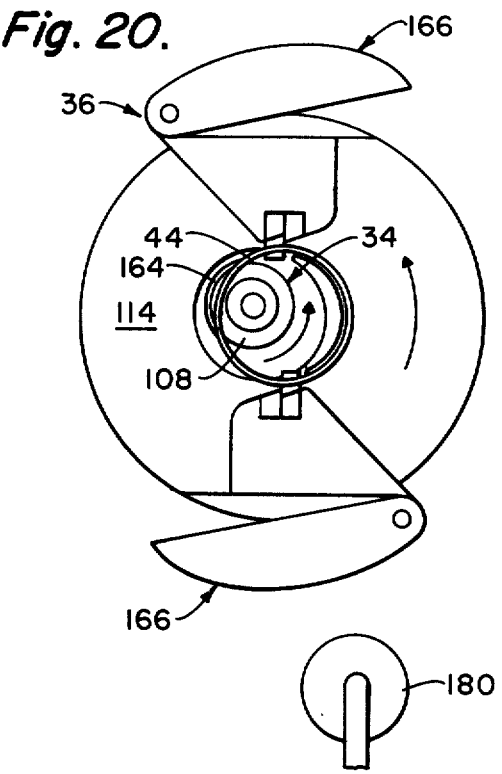
Figure 21:
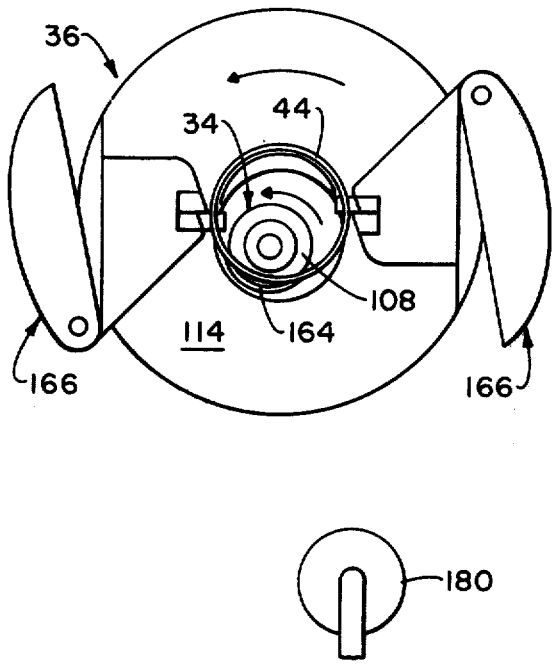
Figure 22:
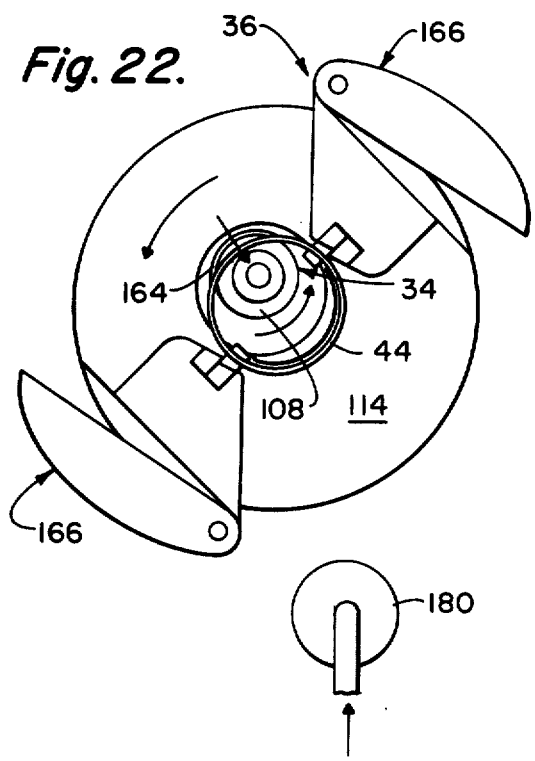

As shown in FIG. 19, immediately upon the FIG. 18 positioning of the untrimmed can body 44 at the trimming station 64, the trimmer knife 108 begins to be cammed radially outwardly toward the wall of the untrimmed can body 44, the trimmer knife and nipper assemblies 166 continuing to rotate, but the nipper assemblies remaining non-actuated by the lowered position of the actuating roller 180. In FIG. 20, the trimmer knife 108 has moved fully radially outwardly piercing the wall of the untrimmed can body 44 acting against the cutter ring 104 (FIG. 18) and starting to produce the scrap ring 164 by the can body trimming operation. In FIG. 21, the trimmer knife 108 has partially circumferentially rotated to continue the can body trimming operation and in FIG. 22, the trimmer knife 108 has completed its one circumferential revolution fully severing the scrap ring 164 from the open end 48 of the untrimmed can body 44 ready for trimmer knife radially inward retraction and with the actuating roller 180 moving upwardly into position for actuating the nipper assemblies 166.

As shown in FIG. 24, as the trimmer knife 108 moves radially inwardly, the first of the nipper assemblies 166 with the scrap ring 164 now rotating therewith arrives at the now raised actuating roller 180 so that as this nipper assembly passes the actuating roller, the camming surface 178 of the nipper actuating 170 contacts the actuating roller forcing the nipper rod 184 radially inwardly past the scrap positioner 190 cutting or nipping one side of the scrap ring 164. The continuous rotation of the cutter and nipper frame 114 causes the same actuation of the second nipper assembly 166 as shown in FIG. 25, so that the cut or nipped portions of the scrap ring 164 fall downwardly away from the trimming mechanism and scrap disposal assemblies 34 and 36. Immediately thereafter, as shown in FIG. 26, the actuating roller 180 is withdrawn downwardly into non-actuating position.

While the nipping action of the scrap ring 164 by the scrap disposal assembly 36 was taking place, the pusher mechanism 62 was being actuated to carry out its retraction stroke to the left and through the vacuum gripping thereof, the withdrawal of the now trimmed can body 58 from the trimming station 64 to the feed station 54. As shown in FIG. 23, the pusher tube 76 has just withdrawn the trimmed can body 58 fully into the star wheel 52, and as shown in FIG. 27, the ejector 88 has ultimately contacted the ejector stop 74 moving the ejector axially forwardly relative to the vacuum cup 80 causing the vacuum supply to the vacuum cup to be cut off or terminated and the ejector contacting the closed end 46 of the trimmed can body 58 ejecting the trimmed can body from the pusher mechanism 62. The pusher mechanism 62 has, therefore, now completed its retraction or withdrawal stroke and is in position ready for the start of the next cycle, while the star wheel 52 begins its indexing movement to carry the trim can body 58 away from the feed station 54 and position the next untrimmed can body 44 at the feed station as in FIG. 16, thereby completing the cycle.

Although the unique feed mechanism principles of the present invention have been illustrated and described herein in relation to a metallic can body trimmer, it is not intended thereby to limit the principles of the present invention to trimmers or other can making equipment alone. It is obvious to those skilled in the art that the improvements of the present invention are applicable to many forms of equipment of various types so that the scope of the present invention should be broadly construed.

I claim:

1. In a scrap ring disposal mechanism for metallic can body trimmers and the like of the type wherein a metallic can body is positioned on a mandrel with can body walls at a can body open end being trimmed to sever an annular scrap ring therefrom; the combination of: an annular rotatable frame generally radially outwardly surrounding said can body open end to be trimmed; scrap positioning means on said frame for axially receiving a portion of said can body walls at said body open end of a can body positioned on said mandrel including at least a part of said scrap ring to be severed from said can body during said trimming, said scrap positioning means rotating said scrap ring at least after said scrap ring severing and during rotation of said frame; at least two circumferentially spaced nipper assemblies on said frame each including nipper means actuatable for completely cutting said scrap ring into separated scrap pieces at said nipper assembly; drive means for rotating said frame; nipper actuating means at a circumferential location generally stationary relative to said frame rotation for actuating said nipper means one at a time after said scrap ring severing and during nipper assembly movement past said circumferential location.

2. A scrap ring disposal mechanism as defined in claim 1 in which said nipper means are each actuatable against said scrap positioning means for completely cutting said scrap ring into said separated scrap pieces; and in which said nipper actuating means actuates said nipper means one at a time against said scrap positioning means.

3. A scrap ring disposal mechanism as defined in claim 1 in which each of said nipper means includes surface means thereon circumferentially movably engageable by a surface of said nipper actuating means for actuating said nipper means during said nipper assembly movement past said nipper actuating means circumferential location.

4. A scrap ring disposal mechanism as defined in claim 1 in which each of said nipper means includes cam surface means circumferentially movably engaged by a freely movable surface of said nipper actuating means for actuating said nipper means during said nipper assembly movement past said nipper actuating means circumferential location.

5. A scrap ring disposal mechanism as defined in claim 1 in which each of said nipper means includes cam surface means circumferentially movably engaged by a surface of said nipper actuating means during said actuation of said nipper means forcing at least a part of said nipper means inwardly and acting against said scrap positioning means to completely cut said scrap ring into said separated scrap pieces.

6. A scrap ring disposal mechanism as defined in claim 1 in which each of said nipper means includes a pivotal actuator pivotal inwardly against a generally radially reciprocal nipper rod, said pivotal actuator pivoting inwardly to move said nipper rod inwardly during said nipper means actuation to cut said scrap ring; and in which said nipper actuating means contacts said nipper means pivotal actuator for pivoting said pivotal actuator inwardly to actuate said nipper means.

7. A scrap ring disposal mechanism as defined in claim 1 in which each of said nipper means includes a pivotal actuator pivotal inwardly against a generally radially reciprocal nipper rod, said pivotal actuator pivoting inwardly to move said nipper rod inwardly during said nipper means actuation to cut said scrap ring; in which said nipper actuating means contacts said nipper means pivotal actuator for pivoting said pivotal actuator inwardly to actuate said nipper means; and in which said scrap positioning means includes parts positioned adjacent a path of movement of each of said nipper means nipper rods and said nipper rods in their inward movements act against said scrap positionig means parts to cut said scrap ring into said scrap pieces.

8. A scrap ring disposal mechanism as defined in claim 1 in which each of said nipper means includes a pivotal actuator pivotal inwardly against a generally radially reciprocal nipper rod, said pivotal actuator pivoting inwardly to move said nipper rod inwardly during said nipper means actuation to cut said scrap ring; in which said nipper actuating means contacts said nipper means pivotal actuator for pivoting said pivotal actuator inwardly to actuate said nipper means; and in which said scrap positioning means includes parts at each of said spaced nipper assemblies with said parts having generally radial surfaces intersected by circumferentially extending slots through which portions of said scrap ring circumferentially extend, inner ends of said nipper means nipper rods in said nipper rod inward movement moving along said radial surfaces of said scrap positioning means parts to cut said scrap ring into said separated scrap pieces.

9. A scrap ring disposal mechanism as defined in claim 1 in which each of said nipper means includes a pivotal actuator having a generally circumferentially extending cam surface thereon, said actuator being pivotal inwardly against a generally radially reciprocal nipper rod, said pivotal actuator pivoting inwardly to move said nipper rod inwardly during said nipper rod actuation to cut said scrap ring; in which said nipper actuating means contacts said nipper means pivotal actuator by contacting said actuator cam surface and through said contact pivoting said pivotal actuator inwardly to actuate said nipper means; and in which said scrap positioning means includes parts positioned adjacent a path of movement of each of said nipper means nipper rods and said nipper rods in their inward movements act against said scrap positioning means parts to cut said scrap ring into said scrap pieces.

10. A scrap ring disposal mechanism as defined in claim 1 in which each of said nipper means includes a pivotal actuator pivotal inwardly against a generally radially reciprocal nipper rod, said pivotal actuator having an outwardly facing generally circumferentially extending cam surface, said pivotal actuator pivoting inwardly to move said nipper rod inwardly during said nipper means actuation to cut said scrap ring; in which said nipper actuating means contacts said nipper means pivotal actuator by contacting said actuating cam surface for pivoting said pivotal actuator inwardly to actuate said nipper means; and in which said scrap positioning means includes parts of each of said spaced nipper assemblies with said parts having generally radial surfaces intersected by circumferentially extending slots through which portions of said scrap ring circumferentially extend, inner ends of said nipper means nipper rods in said nipper rod inward movement moving along said radial surfaces of said scrap positioning means parts to cut said scrap ring into said separated scrap pieces.

11. A scrap ring disposal mechanism as defined in claim 1 in which each of said nipper means includes a pivotal actuator pivotal inwardly against a generally radially reciprocal nipper rod, said pivotal actuator having an outwardly facing generally circumferentially extending cam surface, said pivotal actuator pivoting inwardly to move said nipper rod inwardly during said nipper means actuation to cut said scrap ring; in which said nipper actuating means contacts said nipper means pivotal actuator by contacting said actuating cam surface for pivoting said pivotal actuator inwardly to actuate said nipper means; in which said scrap positioning means includes parts of each of said spaced nipper assemblies with said parts having generally radial surfaces intersected by circumferentially extending slots through which portions of said scrap ring circumferentially extend, inner ends of said nipper means nipper rods in said nipper rod inward movement moving along said radial surfaces of said scrap positioning means parts to cut said scrap ring into said separated scrap pieces; and in which said nipper actuating means includes a roller contacting said cam surfaces of said nipper means pivotal actuators for pivoting said pivotal actuators inwardly to actuate said nipper means.

12. A scrap ring disposal mechanism as defined in claim 1 in which scrap removal means is positioned generally radially inwardly of said scrap positioning means for tending to urge any of said scrap ring and said separated scrap pieces thereof in an axial direction away from said scrap ring severing from said can body open end and toward said scrap positioning means which move inwardly contacting said scrap removal means.

13. A scrap ring disposal mechanism as defined in claim 1 in which scrap removal means is positioned generally radially inwardly of said scrap positioning means for tending to urge any of said scrap ring and said separated scrap pieces thereof in an axial direction away from said scrap ring severing from said can body open end and toward said scrap positioning means which move inwardly contacting said scrap removal means, said scrap removal means including a constantly rotating cylinder having surface means thereon for tending to urge any of said scrap ring and separated scrap pieces in said axial direction away from said scrap ring severing from said can body open end.

14. A scrap ring disposal mechanism as defined in claim 1 in which scrap removal means is positioned generally radially inwardly of said scrap positioning means for tending to urge any of said scrap ring and said separated scrap pieces thereof in an axial direction away from said scrap ring severing from said can body open end and toward said scrap positioning means which move inwardly contacting said scrap removal means, said scrap removal means including a constantly rotating cylinder having threaded surface means thereon cut in a direction tending to urge any of said scrap ring and separated scrap pieces in said axial direction away from said scrap ring severing from said can body open end.

15. In a scrap ring disposal mechanism for metallic can body trimmers and the like of the type wherein a metallic can body is positioned on a mandrel with can body walls at a can body open end being trimmed to sever an annular scrap ring therefrom, said can body being retained stationary during said can body open end trimming; the combination of: an annular rotating frame generally radially outwardly surrounding said can body open end to be trimmed; scrap positioning means on said frame for axially receiving a portion of said can body walls at said can body open end of a can body positioned on said mandrel including at least a part of said scrap ring to be severed from said can body during said trimming, said scrap positioning means rotating relative to said scrap ring during said scrap ring severing and while said stationary can body retains said scrap ring stationary, said scrap positioning means engaging and rotating said scrap ring with said frame rotation upon completion of severing of said scrap ring from said can body and termination of support of said scrap ring by said can body; nipper assembly means for engaging said scrap ring during said scrap ring rotation by said scrap positioning means to completely cut said scrap ring into separated scrap pieces, said scrap pieces being urged radially outwardly by centrifical force upon said cutting separation thereof as a result of said scrap ring rotation by said scrap positioning means at time of said cutting by said nipper assembly means.

16. A scrap ring disposal mechanism as defined in claim 15 in which said nipper assembly means includes at least two circumferentially spaced nipper assemblies each including nipper means for completely cutting said scrap ring into said separated scrap pieces.

17. A scrap ring disposal mechanism as defined in claim 15 in which said nipper assembly means includes at least two circumferentially spaced nipper assemblies each including nipper means for completely cutting said scrap ring into said separated scrap pieces, said nipper means being actuatable one at a time to complete said cutting of said scrap ring into said separated scrap pieces at actuation of the last actuated of said nipper means.

18. A scrap ring disposal mechanism as defined in claim 15 in which said nipper assembly means includes at least two circumferentially spaced nipper assemblies each including nipper means for completely cutting said scrap ring into said separated scrap pieces, each of said nipper means being operable against said scrap positioning means upon actuation thereof for cutting said scrap ring into said separated scrap pieces.

19. A scrap ring disposal mechanism as defined in claim 15 in which scrap removal means is positioned generally radially inwardly of said scrap positioning means for tending to urge any of said scrap ring and said separated scrap pieces thereof in an axial direction away from said scrap ring severing from said can body open end and toward said scrap positioning means which move inwardly contacting said scrap removal means.

20. In a scrap ring disposal mechanism for metallic can body trimmers and the like of the type wherein a metallic can body is positioned on a mandrel with can body walls at a can body open end being trimmed to sever an annular scrap ring therefrom; the combination of: scrap positioning means for axially receiving a portion of said can body walls at said can body open end of a can body positioned on said mandrel including at least a part of said scrap ring to be severed from said can body during said trimming; nipper assembly means actuatable for completely cutting said scrap ring into separated scrap pieces; nipper actuating means for actuating said nipper assembly means after said scrap ring severing; scrap removal means generally radially inwardly of said scrap positioning means for tending to urge any of said scrap ring and said separated scrap pieces thereof in an axial direction away from said scrap ring severing from said can body open end and toward said scrap positioning means which move inwardly contacting said scrap removal means.

21. A scrap ring disposal mechanism as defined in claim 20 in which said scrap removal means includes a constantly rotating cylinder having surface means thereon tending to urge any of said scrap ring and separated scrap pieces in said axial direction away from said scrap ring severing.

22. A scrap ring disposal mechanism as defined in claim 20 in which said scrap removal means includes a constantly rotating cylinder having surface means thereon comprised of a directional threaded surface threaded in a direction tending to urge any of said scrap ring and separated scrap pieces in said axial direction away from said scrap ring severing.

* * * * *